(12) United States Patent
Han et al.

(10) Patent No.: US 11,129,107 B2
(45) Date of Patent: Sep. 21, 2021

(54) METHOD AND DEVICE FOR TRANSMITTING AND RECEIVING DATA OF TERMINAL IN WIRELESS COMMUNICATION SYSTEM

(71) Applicant: LG ELECTRONICS INC., Seoul (KR)

(72) Inventors: Sangwook Han, Seoul (KR); Gwanmo Ku, Seoul (KR); Sangrim Lee, Seoul (KR); Hojae Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 54 days.

(21) Appl. No.: 16/603,209

(22) PCT Filed: Jan. 23, 2018

(86) PCT No.: PCT/KR2018/001032
§ 371 (c)(1),
(2) Date: Oct. 4, 2019

(87) PCT Pub. No.: WO2018/186572
PCT Pub. Date: Oct. 11, 2018

(65) Prior Publication Data
US 2021/0084597 A1    Mar. 18, 2021

Related U.S. Application Data

(60) Provisional application No. 62/565,150, filed on Sep. 29, 2017, provisional application No. 62/521,511, (Continued)

(51) Int. Cl.
*H04W 72/04* (2009.01)
*H04W 52/14* (2009.01)
(Continued)

(52) U.S. Cl.
CPC ....... *H04W 52/146* (2013.01); *H04W 52/285* (2013.01); *H04W 52/367* (2013.01);
(Continued)

(58) Field of Classification Search
CPC ............ H04W 52/146; H04W 52/367; H04W 52/285; H04W 80/02; H04W 56/001; H04W 74/0833
See application file for complete search history.

(56) References Cited

U.S. PATENT DOCUMENTS

2010/0311460 A1    12/2010  Hofmann et al.
2012/0163325 A1    6/2012   Lee et al.
(Continued)

FOREIGN PATENT DOCUMENTS

| DE | 102006050354 | 4/2008 |
| JP | 2001053676 | 2/2001 |
| KR | 1020110093966 | 8/2011 |

OTHER PUBLICATIONS

PCT International Application No. PCT/KR2018/001032, International Search Report dated May 11, 2018, 5 pages.
(Continued)

*Primary Examiner* — Hassan Kizou
*Assistant Examiner* — Mahbubul Bar Chowdhury
(74) *Attorney, Agent, or Firm* — Lee, Hong, Degerman, Kang & Waimey

(57) ABSTRACT

The present invention relates to a method and device for allowing a terminal to transmit, to a base station, uplink data in a wireless communication system. According to the present invention, the terminal: performs a random access procedure with a base station; sets transmission power for transmitting first uplink data; and transmits, to the base station, the first uplink data according to the set transmission power, wherein the transmission power can be set according to an altitude of the terminal.

20 Claims, 16 Drawing Sheets

Related U.S. Application Data filed on Jun. 18, 2017, provisional application No. 62/481,653, filed on Apr. 4, 2017.

(51) Int. Cl.
  *H04W 52/28* (2009.01)
  *H04W 52/36* (2009.01)
  *H04W 56/00* (2009.01)
  *H04W 74/08* (2009.01)
  *H04W 80/02* (2009.01)

(52) U.S. Cl.
  CPC ..... *H04W 56/001* (2013.01); *H04W 74/0833* (2013.01); *H04W 80/02* (2013.01)

(56) References Cited

U.S. PATENT DOCUMENTS

| | | | |
|---|---|---|---|
| 2015/0045084 A1* | 2/2015 | Morimoto | H04W 52/40 455/522 |
| 2015/0271758 A1 | 9/2015 | Park | |
| 2017/0164408 A1* | 6/2017 | Takeda | H04W 74/08 |
| 2018/0302862 A1* | 10/2018 | Takata | H04W 52/247 |
| 2018/0317180 A1* | 11/2018 | Li | H04W 72/085 |
| 2019/0268852 A1* | 8/2019 | Ryu | H04W 56/001 |
| 2020/0100187 A1* | 3/2020 | Balasubramanian | B64C 39/024 |

OTHER PUBLICATIONS

European Patent Office Application Serial No. 18780704.5, Search Report dated Jun. 28, 2021, 12 pages.

Huawei, HiSilicon, "Potential enchancements for drones", R1-1704287, 3GPP TSG RAN G1 Meeting #88bis, Apr. 2017, 3 pages.

LG Electronics, "Potential enhancements to LTE for aerial vehicles", R1-1704855, 3GPP TSG RAN WG1 Meeting #88bis, Apr. 2017, 3 pages.

NTT Docomo, "Initial views on potential problems and solutions for aerial vehicles", R1-1705699, 3GPP TSG RAN WG1 #8bis, Apr. 2017, 6 pages.

* cited by examiner

FIG. 7
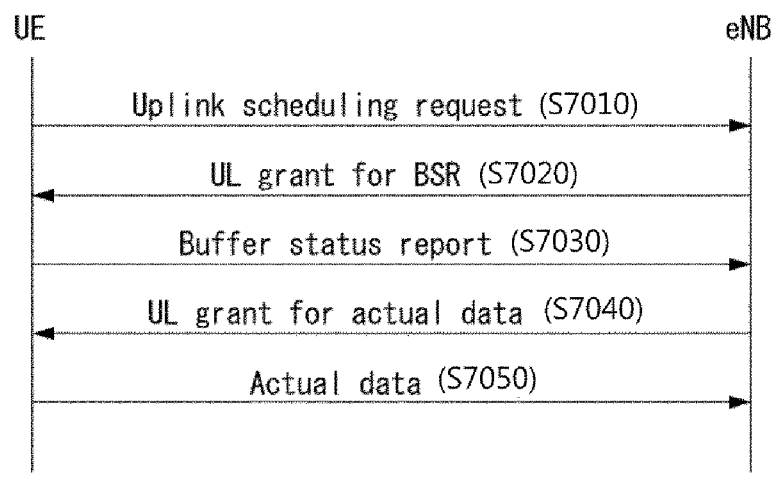
(a)
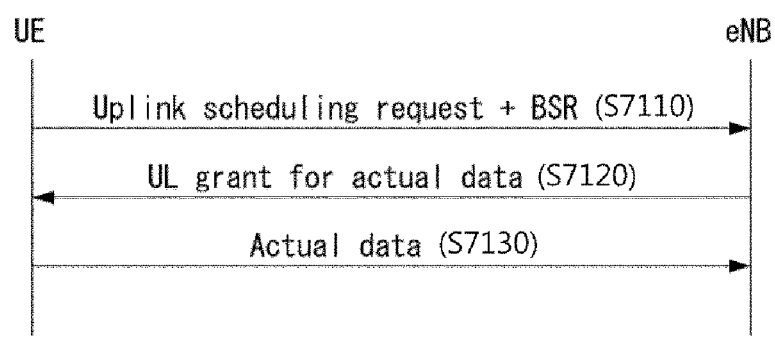
(b)

METHOD AND DEVICE FOR TRANSMITTING AND RECEIVING DATA OF TERMINAL IN WIRELESS COMMUNICATION SYSTEM

CROSS-REFERENCE TO RELATED APPLICATIONS

This application is the National Stage filing under 35 U.S.C. 371 of International Application No. PCT/KR2018/001032, filed on Jan. 23, 2018, which claims the benefit of U.S. Provisional Application No. 62/481,653, filed on Apr. 4, 2017, 62/521,511, filed on Jun. 18, 2017, and 62/565,150, filed on Sep. 29, 2017, the contents of which are all hereby incorporated by reference herein in their entirety.

TECHNICAL FIELD

The present disclosure relates to a method for transmitting or receiving, by a terminal, data in a wireless communication system and, more particularly, to a method and apparatus for transmitting or receiving data by controlling transmission power of a terminal.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for high-speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

In a wireless communication system, a terminal gets access to a base station through Random access Procedure to transmit uplink data to the base station.

However, in the case that there are multiple terminals that are allocated with an identical temporary identifier in the Random access Procedure, there is a problem that the terminal is unable to identify whether its own Random access Procedure is failed or not until a timer expires in a Contention Resolution step.

In addition, in the case that a terminal gets accesses to a base station and transmits uplink data, when the terminal transmits uplink data in high altitude like in a drone, interference exerted on an adjacent terminal or a base station increases.

Accordingly, in the case that a terminal uplink data in high altitude, the interference exerted on an adjacent terminal or a base station needs to be considered.

The technical objects to attain in the present disclosure are not limited to the above-described technical objects and other technical objects which are not described herein will become apparent to those skilled in the art from the following description.

Technical Solution

In order to solve the problem described above, according to an embodiment of the present disclosure, a method for transmitting uplink data to a base station in a wireless communication system includes performing a random access procedure with the base station; configuring a transmission power for transmitting first uplink data; and transmitting the first uplink data to the base station according to the configured transmission power, wherein the transmission power is configured depending on an altitude of the User Equipment.

In addition, the present disclosure further includes receiving control information including a first parameter and a second parameter for configuring the transmission power depending on the altitude from the base station, wherein the transmission power is configured according to the first parameter and the second parameter, wherein the first parameter indicates the altitude, and wherein the second parameter is an arbitrary integer value for reducing the transmission power depending on the altitude.

In addition, in the present disclosure, the transmission power is reduced according to the following mathematical expression depending on the altitude, and wherein 'a' is the first parameter and 'b' is the second parameter in the following mathematical expression.

In addition, in the present disclosure, the transmission power is configured based on a preconfigured value to the User Equipment and the base station depending on the altitude.

In addition, the present disclosure further includes receiving transmission power information indicating the transmission power from the base station.

In addition, in the present disclosure, the step of configuring the transmission power further includes: when a reception signal power of the first signal is greater than a threshold value, receiving a command indicating a transmission of a transmission power value smaller than the threshold value from the base station; and transmitting the transmission power value to the base station.

In addition, in the present disclosure, the step of configuring the transmission power includes: when a reception signal power of the first signal from the base station is greater than a threshold value, configuring the transmission power of the User Equipment to '0' in a specific duration or receiving an indication message indicating a transmission stop of the uplink data.

In addition, in the present disclosure, the step of performing the random access procedure includes: transmitting a random access preamble for an access to the base station; receiving a random access response message from the base station, wherein the random access response message includes at least one of a Timing Alignment (TA) indicating timing offset information for synchronization, radio resource allocation information used in the uplink or a temporary identifier for UE identification; transmitting second uplink data according to the radio resource allocation information; receiving an indication message indicating decoding failure of the second uplink data from the base station; and retransmitting the second uplink data to the base station.

In addition, in the present disclosure, the indication message is identified by the temporary identifier and transmitted by a MAC sub-header.

In addition, the present disclosure provides a User Equipment for transmitting uplink data to a base station in a wireless communication system including a Radio Frequency Unit for transmission and receiving a radio signal with exterior; and a processor functionally connected to the communication unit, wherein the processor is configured to: perform a random access procedure with the base station; configure a transmission power for transmitting first uplink data; and transmit the first uplink data to the base station according to the configured transmission power, wherein the transmission power is configured depending on an altitude of the User Equipment.

Advantageous Effects

According to the present disclosure, in the case that an identical temporary identifier is allocated to multiple terminals, an indication message that indicates a failure of Random access Procedure is transmitted, even in the case that a timer does not expire, Random access Procedure may be performed again through a vailed temporary identifier.

Furthermore, Random access Procedure may be performed again even in the case that a terminal is not allocated with a temporary identifier, and accordingly, delay owing to the Random access Procedure may be decreased.

Furthermore, according to the present disclosure, transmission power for transmitting uplink data of a terminal is decreased according to an altitude of the terminal, and accordingly, interference exerted on an adjacent terminal or a base station may be reduced.

The technical effects obtained in the present disclosure are not limited to the technical effects described above, and other technical effects not mentioned herein may be understood to those skilled in the art from the description below.

DESCRIPTION OF DRAWINGS

The accompanying drawings included as a part of the detailed description to help an understanding of the present disclosure provide the embodiments for the present disclosure and describe the technical features of the present disclosure together with the detailed description.

FIG. 7 illustrates an uplink resource allocation procedure of a UE in a wireless communication system to which the present application may be applied.

MODE FOR INVENTION

Figure 1:
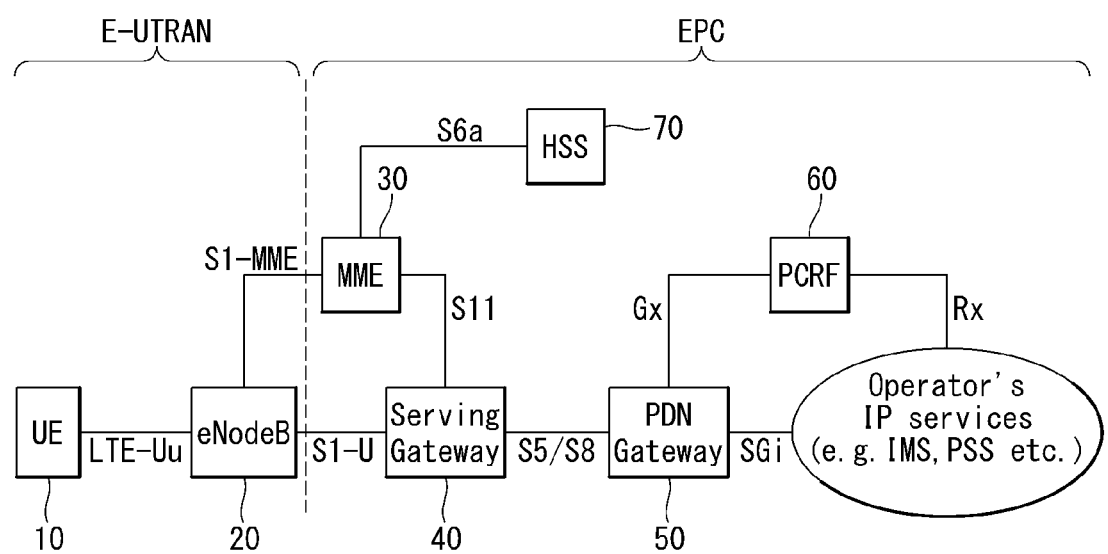
FIG. 1 is a diagram illustrating an example of Evolved Packet System (EPS) which is associated with the LTE system to which the present disclosure may be applied.

Reference will now be made in detail to the preferred embodiments of the present disclosure, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present disclosure. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present disclosure.

A message, a frame, a signal, a field and a device described in the present disclosure it just for describing the present disclosure, not limited to each of the terms, but may be replaced by other message, frame, signal, field and device that performs the same function.

In the present disclosure, a base station has a meaning of a terminal node of a network, which directly communicates with a terminal. In some cases, a specific operation described as being performed by the base station may also be performed by an upper node of the base station. Namely, it is apparent that, in a network including a plurality of network nodes including a base station, various operations performed for communication with a terminal may be performed by the base station, or network nodes other than the base station. The term 'base station (BS)' may be replaced by the term 'fixed station', 'Node B', 'evolved-NodeB (eNB)', 'base transceiver system (BTS)', 'access point (AP)', and the like.

In addition, the term 'terminal" may be fixed or mobile, and may be replaced with the term 'user equipment (UE)', 'mobile station (MS)', 'user terminal (UT)', 'mobile subscriber station (MSS)', 'subscriber station (SS)', 'advanced mobile station (AMS)', 'wireless terminal (WT)', 'machinetype communication (MTC) device', 'machine-to-machine (M2M) device', 'device-to-device (D2D) device', and the like.

Hereinafter, the downlink (DL) means communication from a base station to a terminal, and the uplink (UL) means communication from a terminal to a base station. In the downlink, a transmitter may be part of a base station, and a receiver may be part of a terminal. In the uplink, a transmitter may be part of a terminal, and the receiver may be part of a base station.

Specific terms described in the following description are provided to help understanding of the present disclosure, and the use of such specific terms may be changed in other forms without departing the technical spirit of the present disclosure.

The following technology may be used for various radio access systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented as a radio technology, such as universal terrestrial radio access (UTRA) or CDMA2000. TDMA may be implemented as a radio technology, such as global system for mobile communications (GSM)/general packet radio service (GPRS)/enhanced data rates for GSM evolution (EDGE). OFDMA may be implemented as a radio technology, such as IEEE 802.11 (Wi-Fi), IEEE 802.16 (WiMAX), IEEE 802-20, or evolved UTRA (E-UTRA). UTRA is part of a universal mobile telecommunications system (UMTS). 3rd generation partnership project (3GPP) long term evolution (LTE) is part of an evolved UMTS (E-UMTS) using E-UTRA and adopts OFDMA in the downlink and adopts SC-FDMA in the uplink. LTE-advanced (A) is the evolution of 3GPP LTE.

FIG. 1 is a diagram illustrating an example of Evolved Packet System (EPS) which is associated with the LTE system to which the present disclosure may be applied.

The LTE system aims to provide seamless Internet Protocol (IP) connectivity between a user equipment (UE) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a UE and a base station, it is accompanied by an evolution of the non-radio aspects under the term 'System Architecture Evolution' (SAE) which includes an Evolved Packet Core (EPC) network. The LTE and SAE include the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers.

As shown in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 60, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

In the present disclosure, the MME 30 corresponds to an entity in which a function necessary to process authentication of the UE and context information is implemented, where the MME 30 is described as one embodiment, of the entity. Therefore, other devices in addition to the MME 30 may also carry out the corresponding function.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

In the present disclosure, the S-GW 40 corresponds to an entity in which a function necessary for processing authentication of the UE and context information is implemented, where the S-GW 40 is described as one embodiment of the entity. Therefore, other devices in addition to the S-GW 40 can also carry out the corresponding function.

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

In the present disclosure, the P-GW 50 corresponds to an entity in which a function necessary for processing routing/forwarding of user data is implemented, where the P-GW 50 is described as one embodiment of the entity. Therefore, other devices in addition to the P-GW 50 can also carry out the corresponding function.

The PCRF 60 performs policy control decision-making and performs flow-based charging.

The HSS 70 is also called a home location register (HLR) and includes an EPS-subscribed QoS profile and SAE subscription data including access control information for roaming. Furthermore, the HSS also includes information about a PDN accessed by a user. Such information may be maintained in an access point name (APN) form. The APN is a domain name system (DNS)-based label and is an identity scheme that describes an access point for a PDN or a PDN address indicative of a subscribed IP address.

As shown in FIG. 1, various interfaces, such as S1-U, S1-MME, S5/S8, S11, S6a, Gx, Rx and SG, may be defined between EPS network elements.

Hereinafter, the concept of mobility management (MM) and an MM back-off timer are described in detail. The mobility management (MM) is a procedure for reducing overhead on the E-UTRAN and processing in a UE.

If the mobility management (MM) is applied, all of pieces of information related to a UE in an access network may be released during the cycle in which data is deactivated. The MME may maintain UE context and information related to a configured bearer during an Idle interval.

A UE may notify a network of a new location whenever it deviates from a current tracking area (TA) so that the network may contact the UE in the ECM-IDLE state. Such a procedure may be called "Tracking Area Update." This procedure may be called "Routing Area Update" in a universal terrestrial radio access network (UTRAN) or GSM EDGE radio access network (GERAN) system. The MME performs a function for tracking a user location while a UE is in the ECM-IDLE state.

If downlink data to be delivered to a UE in the ECM-IDLE state is present, the MME transmits a paging message to all of eNodeBs on a tracking area (TA) with which the UE has been registered.

Next, the base station starts paging for the UE on a radio interface. When the paging message is received, the base station performs a procedure that enables the state of the UE to switch to the ECM-CONNECTED state. Such a procedure may be called a "Service Request Procedure." Accordingly, information related to the UE is generated in the E-UTRAN, and all of bearers are re-established. The MME performs the re-establishment of the radio bearers and a function of updating UE context on the base station.

If the mobility management (MM) procedure is performed, a mobility management (MM) backoff timer may be additionally used. Specifically, the UE may transmit tracking area update (TAU) in order to update the TA. The MME may reject a TAU request due to core network congestion. In this case, the MME may provide a time value related to the MM backoff timer. When the corresponding time value is received, the UE may activate the MM backoff timer.

Figure 2:
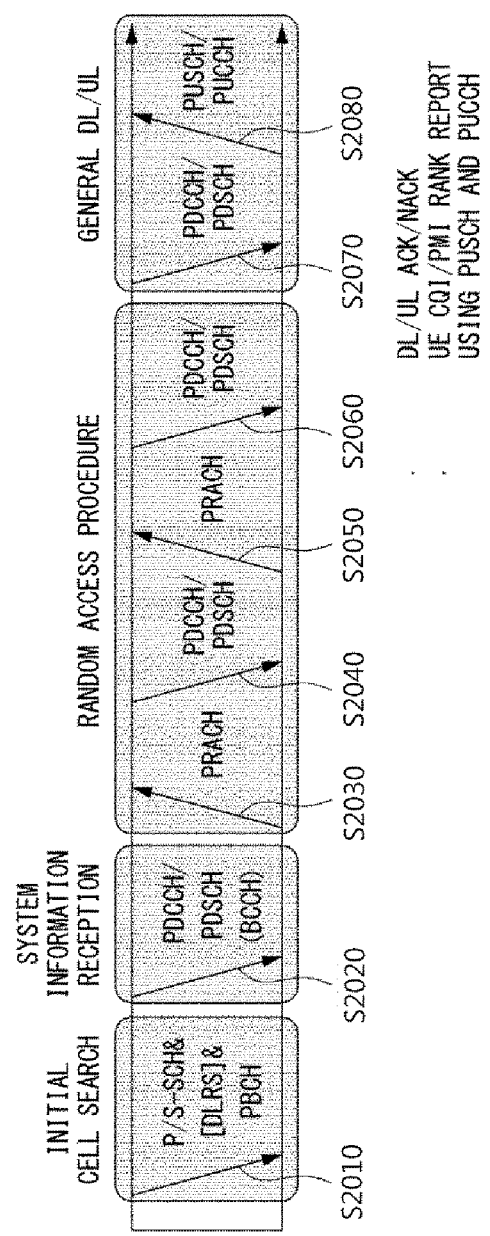
FIG. 2 illustrates physical channels used for the 3GPP LTE/LTE-A system to which the present invention may be applied and a general signal transmission method using the physical channels.

FIG. 2 illustrates physical channels used for the 3GPP LTE/LTE-A system to which the present disclosure may be applied and a general signal transmission method using the physical channels.

A UE, which may have been powered on again from the power-off state or may have newly entered a cell, carries out the initial cell search task such as synchronizing itself with an eNB in step S2010. To this purpose, the LIE synchronizes with the eNB by receiving a primary synchronization channel (P-SCH) and a secondary synchronization channel (S-SCH) from the eNB and obtains information such as a cell identifier (ID).

Afterwards, the UE receives a physical broadcast channel (PBCH) signal from the eNB and obtains broadcast signal within the eNB. Meanwhile, the UE receives a downlink reference signal (DL RS) in the initial cell search step to check the downlink channel status.

The UE which has finished the initial cell search receives a PDSCH according to the PDCCH and PDCCH information in step S2020 to obtain more specific system information.

Next, the UE may carry out a random access procedure such as steps of S2020 to S2060 to complete a connection process to the eNB. To this purpose, the UE transmits a preamble through a physical random access channel (PRACH) (step, S2030) and receives a response message in response to the preamble through a PDSCH corresponding to the PRACH (step, S2040). In the case of contention-based random access, the UE may perform a contention resolution procedure including transmission of an additional PRACH signal (step, S2050) and reception of a PDCCH signal and the PDSCH signal corresponding to the PDCCH signal (step, S2060).

Afterwards, the UE which has carried out the procedure above may carry out reception (step, S2070) of the PDCCH signal and/or PDSCH signal and transmission (step, S2080) of a PUSCH signal and/or a PUCCH signal as a conventional uplink/downlink signal transmission procedure.

The control information that the UE transmits to the eNB is called collectively uplink control information (UCI). The UCI includes HARQ-ACK/NACK, a scheduling request (SR), a channel quality indicator (CQI), a precoding matrix indicator (PMI), and rank indication (RI) information.

In the LTE/LTE-A system, the UCI is transmitted periodically through the PUCCH; the UCI may be transmitted through the PUSCH if control information and traffic data needs to be transmitted at the same time. Also, the UCI may be transmitted non-periodically through the PUSCH according to a request or a command from the network.

Figure 3:
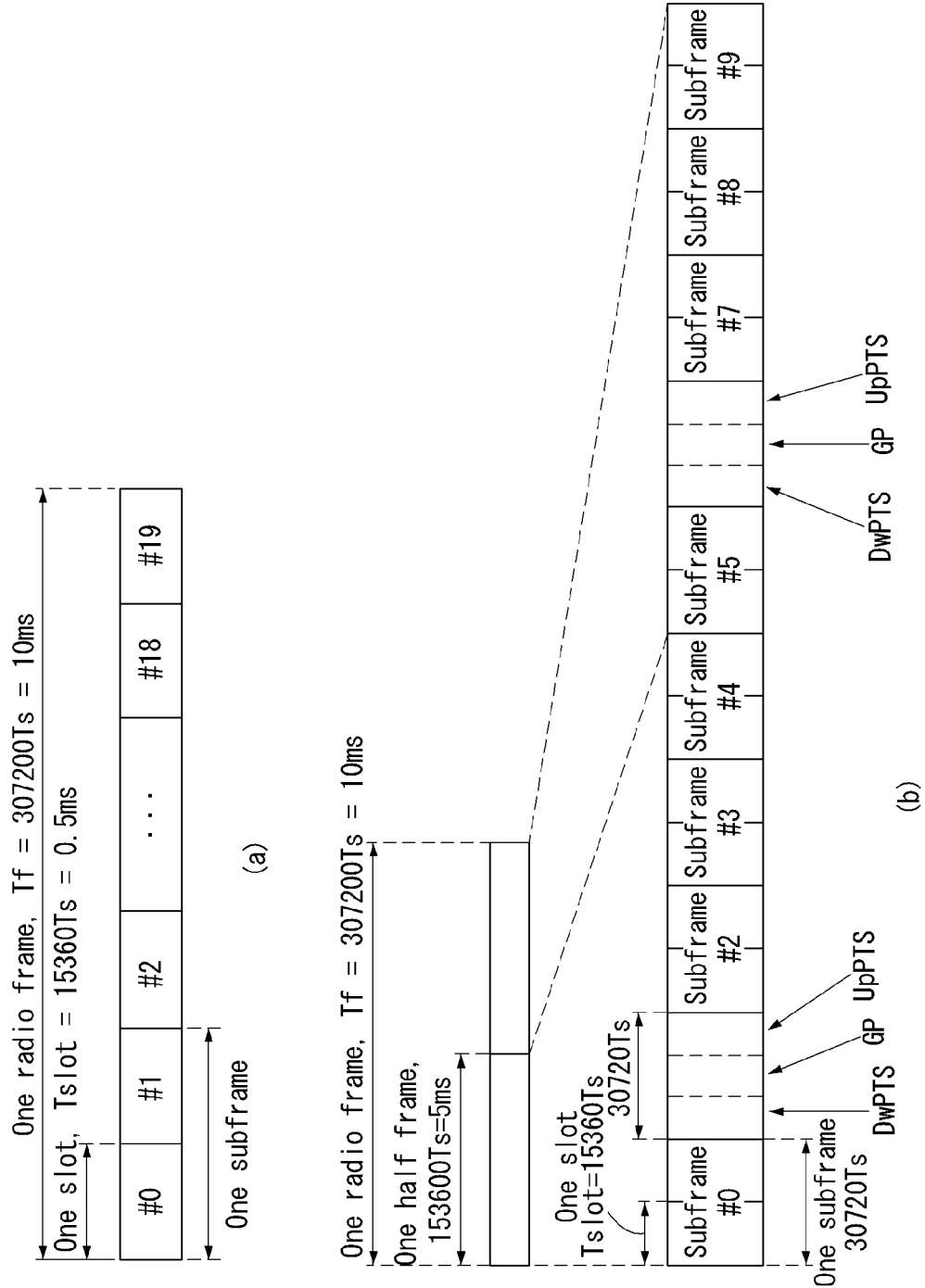
FIG. 3 illustrates the architecture of a radio frame used in a 3GPP LTE/LTE-A system to which the present invention may be applied.

FIG. 3 illustrates the architecture of a radio frame used in a 3GPP LTE/LTE-A system to which the present disclosure may be applied.

In a cellular OFDM radio packet communication system, uplink/downlink data packet transmission is performed in subframe units, and one subframe is defined as a predetermined duration including a plurality of OFDM symbols. The 3GPP LTE/LTE-A standard supports a type-1 radio frame structure applicable to frequency division duplex (FDD) and a type-2 radio frame structure applicable to time division duplex (TDD). According to the FDD scheme, the UL transmission and the DL transmission are performed by occupying different frequency bandwidths. According to the TDD scheme, the UL transmission and the DL transmission are performed on respective times different from each other while occupying the same frequency bandwidth. The channel response in the TDD scheme is substantially reciprocal. This signifies that the DL channel response and the UL channel response are about the same in a given frequency domain. Accordingly, there is a merit that the DL channel response can be obtained from the UL channel response in wireless communication systems based on the TDD. In the TDD scheme, since entire frequency bandwidth is timely divided in the UL transmission and the DL transmission, the DL transmission by an eNB and the UL transmission by a UE may not be performed simultaneously. In the TDD system in which the UL transmission and the DL transmission are distinguished by a unit of subframe, the UL transmission and the DL transmission are performed in different subframes.

FIG. 3(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the 3GPP LTE/LTE-A system, since OFDMA is used in the downlink, an OFDM symbol indicates one symbol period. The OFDM symbol may be referred to as an SC-FDMA symbol or symbol period. An RB as a resource allocation unit may include a plurality of consecutive sub-carriers in one slot.

The number of OFDM symbols included in one slot may be changed according to the configuration of cyclic prefix (CP). CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In the case of the extended CP, for example, the number of OFDM symbols included in one slot may be 6. In the case where a channel state is unstable, such as the case where a UE moves at a high speed, the extended CP may be used in order to further reduce inter-symbol interference.

In the case of using the normal CP, since one slot includes seven OFDM symbols, one subframe includes 14 OFDM symbols. At this time, a maximum of three first OFDM symbols of each subframe may be allocated to a physical downlink control channel (PDCCH) and the remaining OFDM symbols may be allocated to a physical downlink shared channel (PDSCH).

FIG. 3(b) shows the structure of the type-2 radio frame. The type-2 radio frame includes two half frames, and each half frame includes five subframes, and one subframe includes two slots. Among five subframes, particularly, a special subframe includes a downlink pilot time slot (DwPTS), a guard period (GP) and an uplink pilot time slot (UpPTS). The DwPTS is used for initial cell search, synchronization or channel estimation of a UE. The UpPTS is used for channel estimation of a BS and uplink transmission synchronization of a UE. The GP is used to eliminate interference generated in the uplink due to multi-path delay of a downlink signal between the uplink and the downlink.

The structure of the radio frame is only exemplary and the number of subframes included in the radio frame, the number of slots included in the subframe, or the number of symbols included in the slot may be variously changed.

Figure 4:
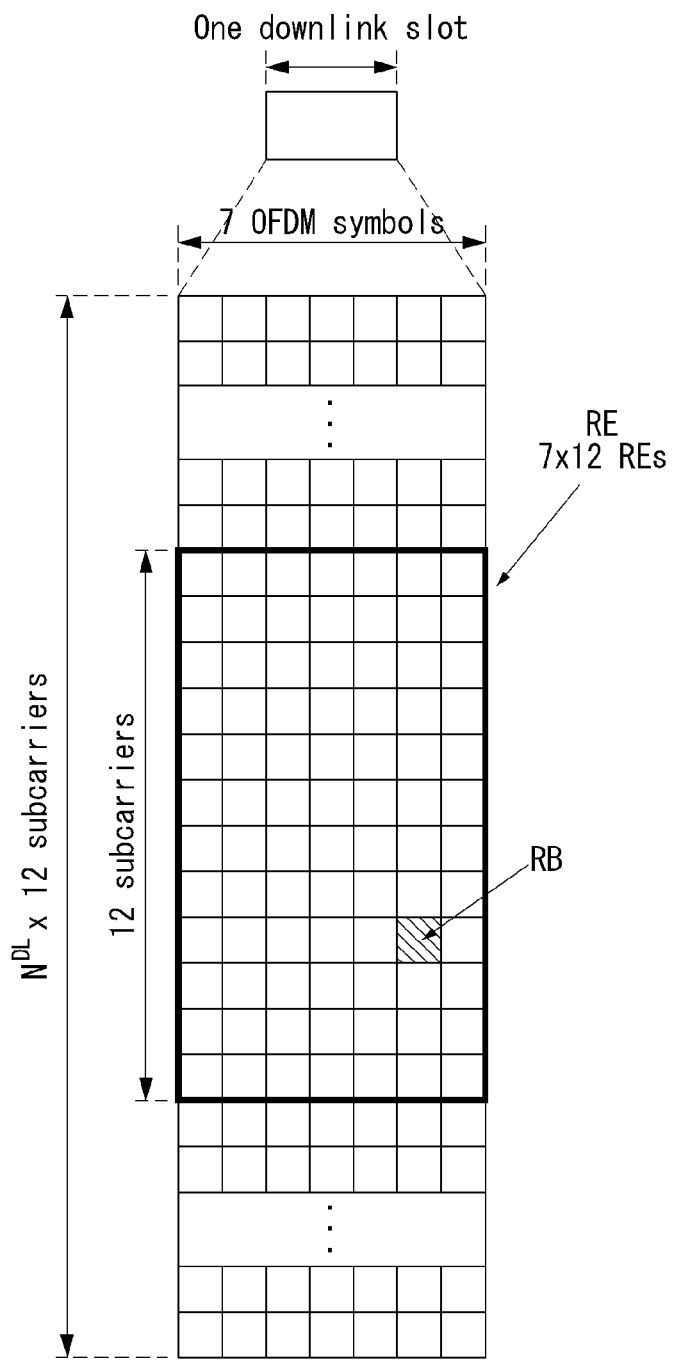
FIG. 4 is a diagram illustrating a resource grid for a single downlink slot in a wireless communication system to which the present disclosure may be applied.

FIG. 4 is a diagram illustrating a resource grid for a single downlink slot in a wireless communication system to which the present disclosure may be applied.

Referring to FIG. 4, one downlink slot includes a plurality of OFDM symbols in a time domain. It is described herein that one downlink slot includes 7 OFDMA symbols and one resource block includes 12 subcarriers for exemplary purposes only, and the present disclosure is not limited thereto.

Each element on the resource grid is referred to as a resource element, and one resource block (RB) includes 12×7 resource elements. The resource element on the resource grid may be identified by an index pair (k, l) in the slot. Here, k (k=0, . . . , $N_{RB}$×12-1) denotes an index of subcarrier in the frequency domain, and l (l=0, . . . , 6) denotes an index of symbol in the time domain. The number NDL of resource blocks included in the downlink slot depends on a downlink transmission bandwidth determined in a cell. The uplink slot structure may be identical to the downlink slot structure.

Figure 5:
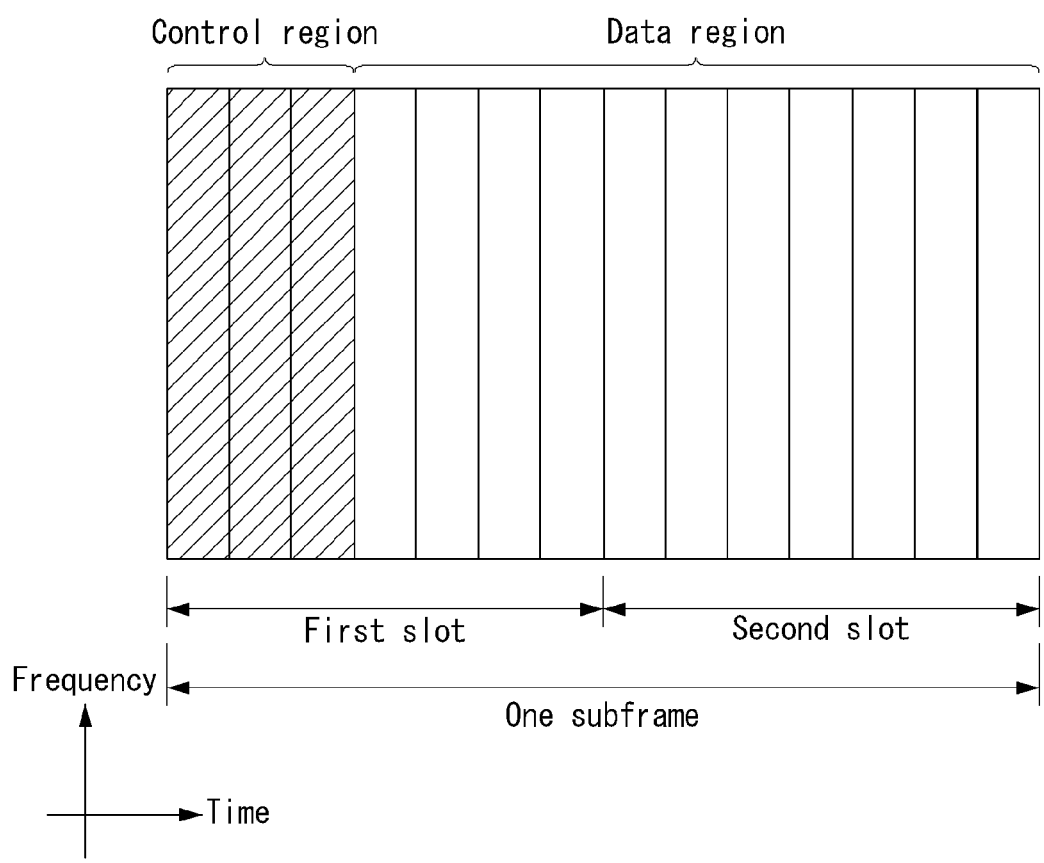
FIG. 5 illustrates a downlink subframe structure in a wireless communication system to which the present disclosure may be applied.

FIG. 5 illustrates a downlink subframe structure in a wireless communication system to which the present disclosure may be applied.

Referring to FIG. 5, a maximum of three OFDM symbols located in a front portion of a first slot of a subframe correspond to a control region in which control channels are allocated, and the remaining OFDM symbols correspond to a data region in which a PDSCH is allocated. Downlink control channels used in 3GPP LTE include, for example, a PCFICH, a PDCCH, and a PHICH.

A PCFICH is transmitted in the first. OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

An eNB determines the format of a PDCCH based on DCI to be transmitted to UE and attaches a Cyclic Redundancy Check (CRC) to control information. A unique identifier (this is called a Radio Network Temporary Identifier (RNTI)) is masked to the CRC depending on the owner or use of a PDCCH. In the case that the PDCCH is a PDCCH for specific UE, an identifier unique to the UE, for example, a Cell-RNTI (C-RNTI) may be masked to the CRC. Or, in the case that the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

Figure 6:
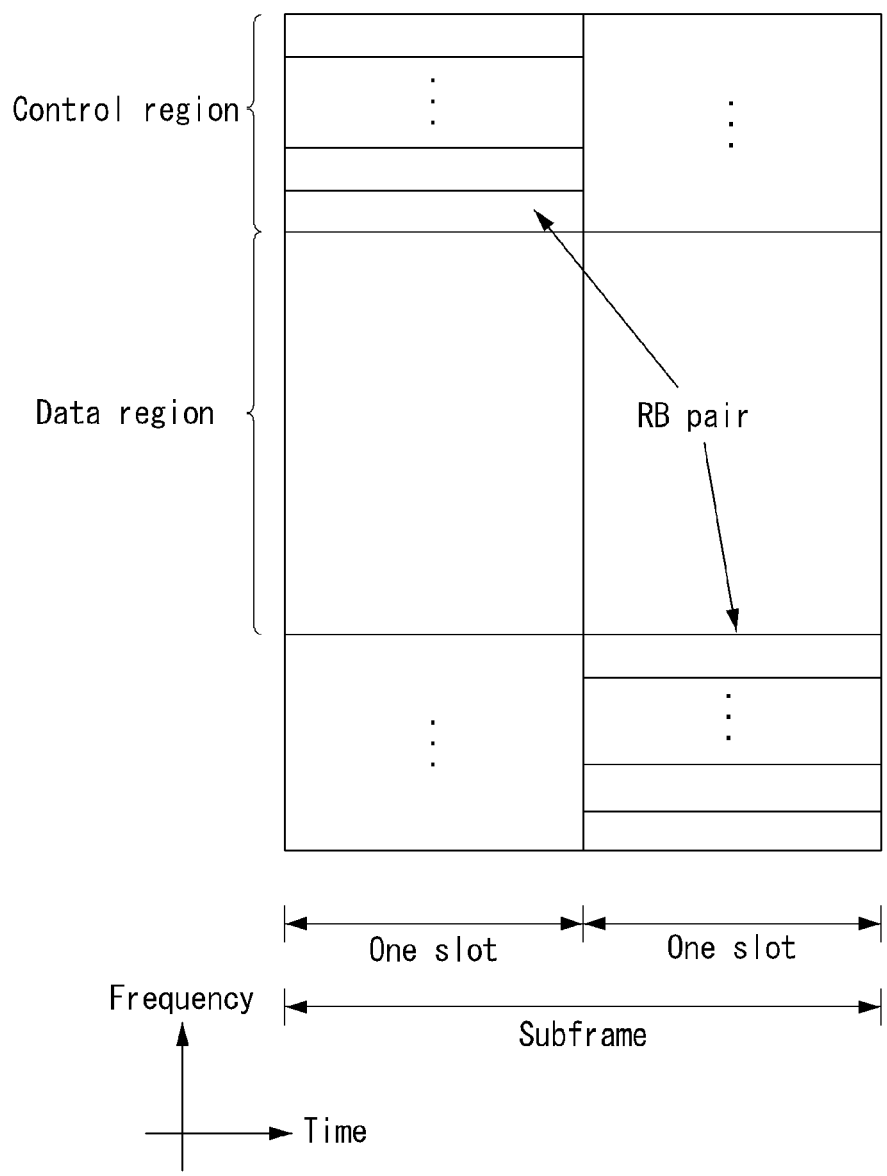
FIG. 6 shows the structure of an uplink subframe in a wireless communication system to which an embodiment of the present invention may be applied.

FIG. 6 shows the structure of an uplink subframe in a wireless communication system to which an embodiment of the present disclosure may be applied.

Referring to the FIG. 6, the uplink subframe may be divided in a frequency domain into a control region and a data region. The control region is allocated with a PUCCH for carrying uplink control information. The data region is allocated with a PUSCH for carrying user data. In the case of being indicated from a higher layer, a UE may simultaneously transmit the PUCCH and the PUSCH. The PUCCH for one UE is allocated to an RB pair in a subframe. RBs belonging to the RB pair allocated to a PUCCH occupy different subcarriers in respective two slots based on a slot boundary. This is called that the RB pair allocated to the PUCCH is frequency-hopped in a slot boundary.

Physical Downlink Control Channel (PDCCH)

The control information transmitted through the PDCCH is referred to as a downlink control indicator (DCI). In the PDCCH, a size and use of the control information are different according to a DCI format. In addition, a size of the control information may be changed according to a coding rate.

Table 1 represents the DCI according to the DCI format.

TABLE 1

| DCI format | Objectives |
| --- | --- |
| 0 | Scheduling of PUSCH |
| 1 | Scheduling of one PDSCH codeword |
| 1A | Compact scheduling of one PDSCH codeword |
| 1B | Closed-loop single-rank transmission |
| 1C | Paging, RACH response and dynamic BCCH |
| 1D | MU-MIMO |
| 2 | Scheduling of rank-adapted closed-loop spatial multiplexing mode |
| 2A | Scheduling of rank-adapted open-loop spatial multiplexing mode |
| 3 | TPC commands for PUCCH and PUSCH with 2 bit power adjustments |
| 3A | TPC commands for PUCCH and PUSCH with single bit power adjustments |
| 4 | the scheduling of PUSCH in one UL cell with multi-antenna port transmission mode |

Referring to Table 1, the DCI format includes format 0 for the PUSCH scheduling, format 1 for scheduling of one PDSCH codeword, format 1A for compact scheduling of one PDSCH codeword, format 1C for very compact scheduling of the DL-SCH, format 2 for PDSCH scheduling in a closed-loop spatial multiplexing mode, format 2A for PDSCH scheduling in an open-loop spatial multiplexing mode, formats 3 and 3A for transmitting a transmission power control (TPC) command for a UL channel, and format 4 for PUSCH scheduling within one UL cell in a multiple antenna port transmission mode.

DCI format 1A may be used for PDSCH scheduling whichever transmission mode is configured to a UE.

Such DCI formats may be independently applied to each UE, and the PDCCHs of several UEs may be simultaneously multiplexed in one subframe.

The PDCCH includes an aggregation of one or a few continuous control channel elements (CCEs). The CCE is a logical allocation unit used for providing a coding rate according to a state of radio channel to the PDCCH. The CCE is referred to as a unit that corresponds to nine sets of resource element group (REG) which is comprised of four resource elements. An eNB may use {1, 2, 4, 8} CCEs for constructing one PDCCH signal, and this {1, 2, 4, 8} is called a CCE aggregation level.

The number of CCEs used for transmitting a specific PDCCH is determined by the eNB according to the channel state. The PDCCH configured according to each UE is mapped with being interleaved to a control channel region of each subframe by a CCE-to-RE mapping rule. A location of the PDCCH may be changed according to the number of OFDM symbols for the control channel, the number of PHICH groups, a transmission antenna, a frequency shift, and the like.

As described above, a channel coding is independently performed for the PDCCH of each multiplexed UE, and the cyclic redundancy check (CRC) is applied. By masking each UE ID to CRC, the UE may receive its PDCCH. However, in the control region allocated in a subframe, the eNB does not provide information on where the PDCCH that corresponds to the UE is.

Since the UE is unable to know on which position its PDCCH is transmitted with which CCE aggregation level and DCI format in order to receive the control channel transmitted from the eNB, the UE finds its own PDCCH by monitoring a set of PDCCH candidates in a subframe. This is called a blind decoding (BD). The blind decoding may also be called a blind detection or a blind search. The blind decoding signifies a method of verifying whether the corresponding PDCCH is its control channel by checking CRC errors, after the UE de-masks its UE ID in CRC part.

Hereinafter, the RRC state and RRC connection method of a UE is described in detail.

The RRC state means whether the RRC layer of a UE has been logically connected to the RRC layer of an E-UTRAN. A case where the RRC layer has been connected is called an RRC connected state, and a case where the RRC layer has not been connected is called an RRC idle state. A UE in the RRC connected state has an RRC connection, and thus an E-UTRAN may identify the presence of the corresponding UE in a cell unit, thus being capable of effectively controlling the UE.

On the contrary, a UE in the RRC idle state may not be identified by an E-UTRAN and is managed by a core network (CN) in a tracking area unit, that is, an area unit greater than a cell. That is, whether the UE in the RRC idle state is present in a large area unit is identified. In order to receive a common mobile communication service, such as voice or data, the terminal needs to switch to the RRC connected state.

When a user first turns on a UE, the UE first searches for a proper cell and then stays in the RRC idle state in the corresponding cell. When the UE in the RRC idle state needs to set up an RRC connection, it establishes the RRC connection with an E-UTRAN through an RRC connection procedure and switches to the RRC connected state. A case where the UE in the RRC idle state needs to establish an RRC connection includes several cases and may include the necessity of uplink data transmission for a reason, such as a call attempt by a user, for example, or response message transmission when a paging message is received from an E-UTRAN.

A non-access stratum (NAS) layer located over the RRC layer performs the functions of session management and mobility management.

In order to manage the mobility of a terminal in the NAS layer, two types of state: such as EPS Mobility Management-REGISTERED (EMM-REGISTERED) and EMM-DEREGISTERED have been defined. The two states are applied to the UE and the MME. Initially, the UE is in the EMM-DEREGISTERED state. The UE performs a process of registering with a corresponding network through an initial attach procedure in order to access a network. When the attach procedure is successfully performed, the UE and the MME become the EMM-REGISTERED state.

In order to manage a signaling connection between a UE and an EPC, two states of an EPS connection management (ECM)-IDLE state and an ECM-CONNECTED state have been defined. The two states are applied to the UE and the MME. When the UE in the ECM-IDLE state sets up an RRC connection with an E-UTRAN, the corresponding UE becomes the ECM-CONNECTED state.

When the MME in the ECM-IDLE state sets up an S1 connection with the E-UTRAN, it becomes the ECM-CONNECTED state. When the UE is in the ECM-IDLE state, the E-UTRAN does not have context information of the UE. Accordingly, the UE in the ECM-IDLE state performs a UE-based mobility-related procedure, such as cell selection or cell reselection, without a command from a network. On the contrary, when the UE is in the ECM-CONNECTED state, the mobility of the UE is managed by a command from the network. In the case that the location of the UE in the ECM-IDLE state is different from that known to the network, the UE notifies the network of the corresponding location of the UE through a tracking area update procedure.

Next, System information is described.

System information includes, essential information that needs to be, known to a UE in order for the UE to access an eNB. Accordingly, the UE needs to receive all of pieces of system information before it accesses the eNB and should always have the newest system information. Furthermore, the system information is information that needs to be known to all of UEs within one cell, and the eNB periodically transmits the system information.

According to section 5.2.2 of 3GPP TS 36.331 V8.7.0 (2009 September) "Radio Resource Control (RRC); Protocol specification (Release 8)", system information is divided into a master information block (MIB), a scheduling block (SB), and a system information block (SIB). The MIB allows a UE to be aware of the physical configuration, for example, a bandwidth of a corresponding cell. The SB provides notification of transmission information, for example, the transmission cycle of SIBs. The SIB is an assembly of pieces of related system information. For example, which SIB includes only information of a neighboring cell, and which SIB includes only information of an uplink radio channel used by a UE.

Hereinafter, it is described an uplink transmission power control method in the LTE system.

The method for a UE to control its own uplink transmission power includes Open Loop Power Control (OLPC) or Closed Loop Power Control (CLPC).

The OLPC is a power control method that power control is performed by estimating downlink signal attenuation from an eNB of a cell to which a UE is belonged and compensating it.

That is, according to the OLPC, uplink power is controlled when a signal attenuation of downlink is serious since a distance between the UE and the eNB becomes greater, uplink transmission power is increased.

The CLPC controls uplink power in the method of directly transferring information (e.g., control signal) required to control uplink transmission power from the eNB.

Equation 1 below is an equation to determine a transmission power of a UE in the case that only a PUSCH is transmitted, but a PUSCH and a PUCCH are not transmitted simultaneously on subframe index i in serving cell c in a system that supports carrier aggregation technique.

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_s(i) \end{Bmatrix} [dBm]$$ [Equation 1]

Equation 2 below is an equation to determine a PUSCH transmission power in the case that a PUSCH and a PUCCH are transmitted simultaneously on subframe index i in serving cell c in a system that supports carrier aggregation technique.

$$P_{PUSCH,c}(i) = \min\begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_s(i) \end{Bmatrix} [dbM]$$ [Equation 2]

Hereinafter, the parameters to be described in relation to Equation 1 and Equation 2 above determine uplink transmission power of a UE in serving cell c.

$P_{CMAX,c}(i)$ of Equation 1 above represents a maximum power of a UE transmittable in subframe index i, and $\hat{P}_{CMAX,c}(i)$ represents a linear value of $P_{CMAX,c}(i)$.

$\hat{P}_{PUCCH}(i)$ of Equation 2 above represents a linear value of $P_{PUCCH}(i)$. Herein, $\hat{P}_{PUCCH}(i)$ represents a PUCCH transmission power in subframe index i.

In Equation 1 above, $M_{PUSCH,c}(i)$ is a parameter representing a bandwidth of PUSCH resource allocation which is represented with a finite resource block number for a subframe index, and a value allocated by an eNB.

$P_{O\_PUSCH}(j)$ is a parameter configured by a summation of $P_{O\_NOMINAL\_PUSCH,c}(j)$, a cell-specific nominal component provided by a higher layer and $P_{O\_UE\_PUSCH,c}(j)$, a UE-specific component provided by a higher layer.

In transmission/retransmission of a PUSCH according to uplink grant, j is 1, and in transmission/retransmission of a PUSCH according to random access response, j is 2.

Further, $P_{O\_UE\_PUSCH,c}(2)=0$ and $P_{O\_NOMINAL\_PUSCH,c}(2)=P_{O\_PRE}+\Delta_{PREAMBLE\_Msg3}$, and parameters $P_{O\_PRE}$ and $\Delta_{PREAMBLE\_Msg3}$ are signaled by a higher layer.

$\alpha_c(j)$ means a pathloss compensation factor.

$\alpha_c(j)$ is a cell-specific parameter provided by a higher layer and transmitted to a UE by an eNB with 3 bits, when j is 0 or 1, $\in \{0, 0.4, 0.5, 0.6, 0.7, 0.8, 0.9, 1\}$ and j is 2, $\alpha_c(j)=1$.

Path loss $PL_c$ is an estimated value of downlink path loss (or signal loss) calculated in a dB unit and may be represented as Equation 3 below.

$$PL_c = \text{referenceSignalPower} - \text{higher layer filteredRSRP}$$ [Equation 3]

In Equation 3, referenceSignalPower may be informed to a UE through a higher layer by an eNB.

$f_c(i)$ is a value representing a current PUSCH power control adjustment state for a subframe index, and may be represented as an absolute value or an accumulated value of the current state.

The accumulation is enabled based on the parameter provided by a higher layer or a TPC command $\delta_{PUSCH,c}$ is included in a PDCCH with DCI format 0 for serving cell c which is scrambled with a temporary identifier (e.g., T-C-RNTI), Equation 4 below is satisfied.

$$f_c(i)=f_c(i-1)+\delta_{PUSCH,c}(i-K_{PUSCH})$$ [Equation 4]

In Equation 4 above, $\delta_{PUSCH,c}(i-K_{PUSCH})$ is signaled to a PDCCH with DCI format 0/4 or 3/3A in subframe $i-K_{PUSCH}$, and $f_c(0)$ means the first value after resetting the accumulation value.

$K_{PUSCH}$ value is 4 for FDD and as represented in Table 2 below for TDD.

TABLE 2

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

Except for the case of DRX state, in every subframe, a UE attempts to decode a PDCCH of DCI format 0/4 with C-RNTI of the UE or a PDCCH of DCI format 3/3A with TPC-PUSCH-RNTI of the UE and DCI format for SPS C-RNTI.

When DCI format 0/4 and DCI format 3/3A for serving cell c are detected in an identical subframe, the UE needs to use $\delta_{PUSCH,c}$ provided in DCI format 0/4.

$\delta_{PUSCH,c}$ is 0 dB for a subframe in which TPC command decoded for serving cell c is not existed, a DRX is generated or subframe of which index i is not uplink subframe in TDD.

The accumulation value of $\delta_{PUSCH,c}$ signaled on a PDCCH with DCI format 0/4 is as represented in Table 4. When a PDCCH with DCI format 0 is validated in SPS activation or released, $\delta_{PUSCH,c}$ is 0 dB.

The accumulation value of $\delta_{PUSCH,c}$ signaled on a PDCCH with DCI format 3/3A is one of SET 1 of Table 3 below or one of SET 2 of Table 4 below determined by a TPC-index parameter provided by a higher layer.

TABLE 3

| TPC Command Field in DCI format 0/3/4 | Accumulated δPUSCH, c [dB] | Absolute δPUSCH, c [dB] only DCI format 0/4 |
|---|---|---|
| 0 | −1 | −4 |
| 1 | 0 | −1 |
| 2 | 1 | 1 |
| 3 | 3 | 4 |

TABLE 4

| TPC Command Field in DCI format 3A | Accumulated δPUSCH, c [dB] |
|---|---|
| 0 | −1 |
| 1 | 1 |

When a UE's power reaches to a maximum transmission power $\hat{P}_{CMAX}(i)$ in serving cell c, a positive TPC command is not accumulated for serving cell c.

On the contrary, when a UE's power reaches to a minimum power, a negative TPC command is not accumulated.

Equation 5 below represents an example of a mathematical expression related to uplink power control for a PUCCH in the LTE system.

$$P_{PUCCH}(i) = \min\left\{ \begin{array}{l} P_{CMAX,c}(i), \\ P_{S\_PUCCH} + PL_c + h(n_{CQI}, n_{HARQ}, n_{SR}) + \\ \Delta_{F\_PUCCH}(F) + \Delta_{DoD}(F') + g(i) \end{array} \right\} [dBm] \quad \text{[Equation 5]}$$

In Equation 5 above, i is a subframe index, and c is a cell index.

In the case that a UE is configured to transmit a PUCCH on two antenna ports by a higher layer, $\Delta_{TxD}$ (F') value is provided to the UE by a higher layer, and 0 otherwise. The parameter described below is for the serving cell of which cell index is c.

Here, $P_{CMAX,c}(i)$ represents a maximum transmittable power of a UE, and $P_{0\_PUCCH}(i)$ is a parameter configured as a summation of cell-specific parameters, which is notified to the UE by an eNB through a higher layer signaling.

$PL_c$ is an estimated value of downlink path loss (or signal loss) that the UE calculates in a dB unit and may be represented as Equation 6 below.

$$PL_c = \text{referenceSignalPower} - \text{higher layer filtere-dRSRP} \quad \text{[Equation 6]}$$

Herein, h(n) is a value changed depending on a PUCCH format, and $n_{CQI}$ is the number of information bits for a Channel Quality Indicator (CQI).

$n_{HARQ}$ represents the number of HARQ bits, and $\Delta_{F\_PUCCH}(F)$ value is a relative value for PUCCH format 1a and corresponds to PUCCH format 1a, and the value is notified to the UE by an eNB through a higher layer signaling.

g(i) represents a current PUCCH power control adjustment state of index i subframe.

When $P_{0\_UE\_PUCCH}$ value is changed in a higher layer, g(0)=0, and otherwise, the value may have a value as represented in Equation 7 below.

$$g(0) = \Delta P_{rampup} + \delta_{msg2} \quad \text{[Equation 7]}$$

In Equation 7, $\delta_{msg2}$ is a TPC command indicated in a random access response, and $\Delta P_{rampup}$ corresponds to total ramp-up from the first to last preambles provided in a higher layer.

When a UE's power reaches to a maximum transmission power $P_{CMAX,c}(i)$ in a primary cell, a positive TPC command is not accumulated for the primary cell.

On the contrary, when a UE's power reaches to a minimum power, a negative TPC command is not accumulated.

The UE resets the accumulation when $P_{0\_UE\_PUCCH}$ value is changed by a higher layer or the UE receives a random access response message.

Meanwhile, Table 5 and Table 6 below represent $\delta_{PUCCH}$ value indicated by a TPC command field in a DCI format.

Particularly, Table 5 represents $\delta_{PUCCH}$ value indicated in the remaining DCI except DCI format 3A, and Table 6 represents $\delta_{PUCCH}$ value indicated in DCI format 3A.

TABLE 5

| TPC Command Field in DCI format 1A/1B/1D/1/2A/2B/2C/2D/2/3 | δPUCCH [dB] |
|---|---|
| 0 | −1 |
| 1 | 0 |
| 2 | 1 |
| 3 | 3 |

TABLE 6

| TPC Command Field in DCI format 3A | δPUCCH [dB] |
|---|---|
| 0 | −1 |
| 1 | 1 |

Equation 8 below represents a mathematical expression related to a power control of a Sounding Reference Signal (SRS) in the LTE system.

$$P_{SRS,c}(i) = \min\left\{ \begin{array}{l} P_{CMAX,c}(i) \\ P_{SRS\_OFFSET,c}(m) + 10\log_{10}(M_{SRS,c}) + \\ P_{O\_PUSCH,c}(j) + \alpha_c(j) \cdot PL_c + f_c(i) \end{array} \right\} [dBm] \quad \text{[Equation 8]}$$

In Equation 8 above, i is a subframe index, and c is a cell index.

Herein, $P_{CMAX,c}(i)$ represents a maximum transmittable power of a UE, and $P_{SRS\_OFFSET,c}(m)$ is a value configured by a higher layer.

$M_{SRS,C}$ is Sounding Reference Signal (SRS) bandwidth in subframe index i of serving cell c, and represented as the number of resource blocks.

$f_c(i)$ is a value representing a current PUSCH power control adjustment state for subframe index i of serving cell c, and $P_{O\_PUSCH,c}(j)$ and $\alpha_c(j)$ are as described in Equation 1 and Equation 2 above.

Uplink Resource Allocation Procedure

In 3GPP LTE/LTE-A system, in order to maximize resource utilization, the data transmission and reception method based on scheduling of an eNB is used. This signifies that if there is data to transmit by a UE, the uplink resource allocation is preferentially requested to the eNB, and the data may be transmitted using only uplink resources allocated by the eNB.

FIG. 7 illustrates an uplink resource allocation procedure of a UE in a wireless communication system to which the present application may be applied.

For efficient utilization of the uplink radio resources, an eNB needs to know which sorts and what amount of data to be transmitted to the uplink for each UE. Accordingly, the UE itself may forward the information of uplink data to transmit, and the eNB may allocate the uplink resources to the corresponding UE based on it. In this case, the information of the uplink data that the UE forwards to the eNB is the quality of uplink data stored in its buffer, and this is referred to as a buffer status report (BSR). The BSR is transmitted using a MAC control element in case that the resources on the PUSCH in current TTI are allocated to the UE and the reporting event is triggered.

FIG. 7(a) exemplifies an uplink resource allocation procedure for actual data in case that the UL radio resources for the buffer status reporting (BSR) are not allocated to a UE. That is, for a UE that switches a state of active mode in the DRX mode, since there is no data resource allocated beforehand, the resource for uplink data should be requested starting from the SR transmission through the PUCCH, in this case, the uplink resource allocation procedure of 5 steps is used.

Referring to FIG. 7(a), the case that the PUSCH resource for transmitting the BSR is not allocated to a UE is illustrated, and the UE transmits the scheduling request (SR) to an eNB first in order to be allocated with the PUSCH resources (step, S7010).

The scheduling request (SR) is used to request in order for the UE to be allocated with the PUSCH resource for uplink transmission in case that the reporting event is occurred, but the radio resource is not scheduled on the PUSCH in current TTI.

That is, the UE transmits the SR on the PUCCH when the regular BSR is triggered but does not have the uplink radio resource for transmitting the BSR to the eNB. The UE transmits the SR through the PUCCH or starts the random access procedure according to whether the PUCCH resources for the SR are configured. In particular, the PUCCH resources in which the SR may be transmitted may be configured by a higher layer (e.g., RRC layer) in a UE-specific manner, and the SR configuration includes SR periodicity and SR subframe offset information.

When the UE receives the UL grant for the PUSCH resources for BSR transmission from an eNB (step, S7020), the UE transmits the triggered BSR through the PUSCH resources which are allocated by the UL grant (step, S7030).

The eNB verifies the quality of data that the UE actually transmit to the uplink through the BSR and transmits the UL grant for the PUSCH resources for actual data transmission to the UE (step, S7040). The UE that receives the UL grant for actual data transmission transmits the actual uplink data to the eNB through the PUSCH resources (step, S7050).

FIG. 7(b) exemplifies the uplink resource allocation procedure for actual data in case that the UL radio resources for the BSR are allocated to a UE.

Referring to FIG. 7(b), the case that the PUSCH resources for BRS transmission are already allocated to a UE is illustrated. In the case, the UE transmits the BSR through the allocated PUSCH resources and transmits a scheduling request to an eNB (step, S7110). Subsequently, the eNB verifies the quality of data to be transmitted to the uplink by the UE through the BSR and transmits the UL grant for the PUSCH resources for actual data transmission to the UE (step, S7120). The UE that receives the UL grant for actual data transmission transmits the actual uplink data to the eNB through the allocated PUSCH resources (step, S7130).

Random Access Procedure (RACH Procedure)

Figure 8:
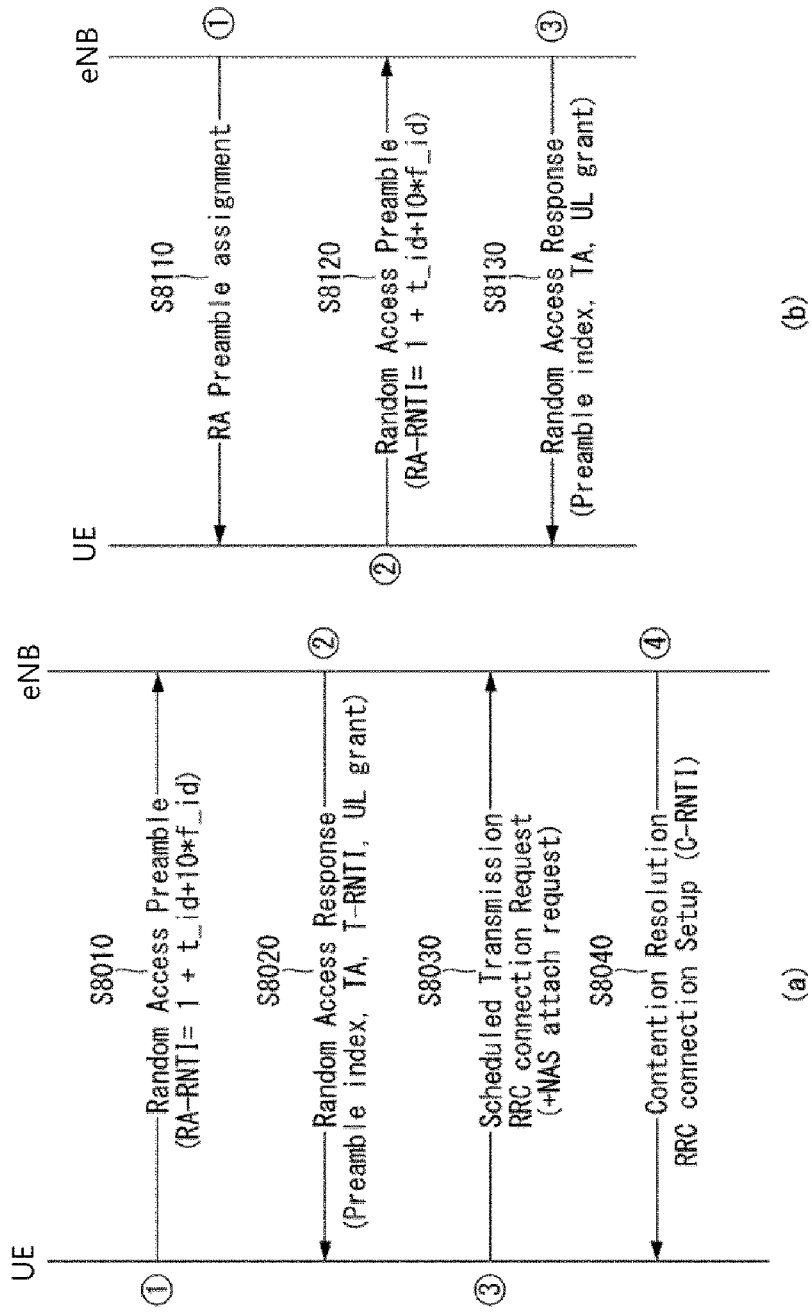
FIG. 8 illustrates one example of a random access procedure in the LTE system.

FIG. 8 illustrates one example of a random access procedure in the LTE system.

The UE carries out the random access procedure (RACH) at the time of the initial connection in the RRC IDLE state, initial connection after radio link failure, handover requiring the RACH, and generation of uplink or downlink data requiring the RACH while in the RRC_CONNECTED state. Part of RRC messages such as the RRC connection request message, cell update message, and UTRAN Registration Area (URA) update message are also transmitted through the random access procedure. Logical channels such as Common Control Channel (CCCH), Dedicated Control Channel (DCCH), and Dedicated Traffic Channel (DTCH) may be mapped to a transmission channel RACH. A transmission channel RACH is mapped to a physical channel such as the Physical Random Access Channel (PRACH).

When the UE's MAC layer instructs the UE's physical layer to start PRACH transmission, the UE's physical layer first selects one access slot and one signature to transmit the PRACH preamble to the uplink. Two types of random access procedure are defined: contention based and non-contention based random access procedures.

FIG. 8(a) shows one example of a contention based random access procedure, while FIG. 8(b) shows one example of a non-contention based random access procedure.

First, the contention based random access procedure is described with reference to FIG. 8(a).

The UE receives information about random access from the eNB through system information and stores the received information. Afterwards, in the case that random access is required, the UE transmits a random access preamble (which is also called a message 1) to the eNB (step, S8010).

When the eNB receives a random access preamble from the UE, the eNB transmits a random access response (which is also called a message 2) to the UE (step, S8020). Particularly, downlink scheduling information with respect to the random access response message is CRC masked with a Random Access-Radio Network Temporary Identifier (RA-RNTI) and transmitted on the L1 or L2 control channel (PDCCH). The UE that receives a downlink scheduling signal masked with the RA-RNTI, receives a random access response message from a Physical Downlink Shared Channel (PDSCH) and decodes the received random access response message. Afterwards, the UE checks the random access response message whether it contains random access response information directed to the UE.

Existence of random access response information directed to the UE may be determined by checking a Random Access Preamble ID (RAID) with respect to a preamble that the UE has transmitted.

The random access response information includes Timing Alignment (TA) representing timing offset information for synchronization, allocation information of radio resources used for uplink, a temporary identifier (e.g., C-RNTI) for UE identification, and the like.

In the case that random access response information is received, the UE carries out uplink transmission (which is also called a message 3) to a uplink Shared Channel (SCH) according to the radio resource allocation information included in the response information (step, S8030). Here, uplink transmission may be expressed as scheduled transmission.

After receiving the uplink transmission from the UE, the eNB transmits a message for contention resolution (which is also called a message 4) to the UE through a Downlink Shared Channel (DL-SCH) (step, S8040).

Next, non-contention based random access procedure is described with reference to FIG. 8(b).

Before the UE transmits a random access preamble, the eNB allocates a non-contention based random access preamble to the UE (step, S8110).

The non-contention based random access preamble may be allocated through a handover command or dedicated signaling such as a PDCCH. In the case that a non-contention based random access preamble is allocated to the UE, the UE transmits the allocated non-contention based random access preamble to the eNB (step, S8120).

Later, the eNB may transmit a random access response (which is also called a message 2) to the UE similarly to step S8020 of the contention based random access procedure (step, S8130).

Although HARQ has not been applied to the random access response during the random access procedure above, the HARQ may be applied to uplink transmission with respect to the random access response or a message for contention resolution. Therefore, the UE doesn't necessarily have to transmit ACK or NACK with respect to the random access response.

Next, a UL data transmission method in the LTA(-A) or 802.16 system is described briefly.

A cellular system such as the LTE(-A) or 802.16m system employs an eNB scheduling-based resource allocation method.

In a system which employs the eNB scheduling based resource allocation method, the UE with data to be transmitted (i.e., UL data) requests resources for transmission of the corresponding data from the eNB before transmitting the data.

The scheduling request of the UE may be carried out through Scheduling Request (SR) transmission to a PUCCH or Buffer Status Report (BSR) transmission to a PUSCH.

Also, in the case that resources used for transmitting SR or BSR are not allocated to the UE, the UE may request uplink resources from the eNB through an RACH procedure.

As described above, the eNB which has received a scheduling request from the UE allocates uplink resources to be used for the corresponding UE through a downlink control channel (i.e., UL grant message or DCI for the LTE(-A) system).

At this time, a UL grant transmitted to the UE may be used to inform the UE of which subframe the resources allocated to the UE correspond to through explicit signaling, but the UL grant may be used to define a predefined timing between the UE and the eNB for resource allocation with respect to a subframe after specific time (for example, 4 ms in the case of the LTE system).

As described above, the eNB's allocating resources to the UE after X ms (for example, 4 ms in the case of the LTE(-A) system) implies that the UE allocates resources by taking into account all of the time periods for the UE to receive and decode a UL grant, to prepare data to be transmitted, and to encode the prepared data.

Hereinafter, with reference to FIG. 9, the contention resolution described in FIG. 8(a) is described in detail.

Contention Resolution

Figure 9:
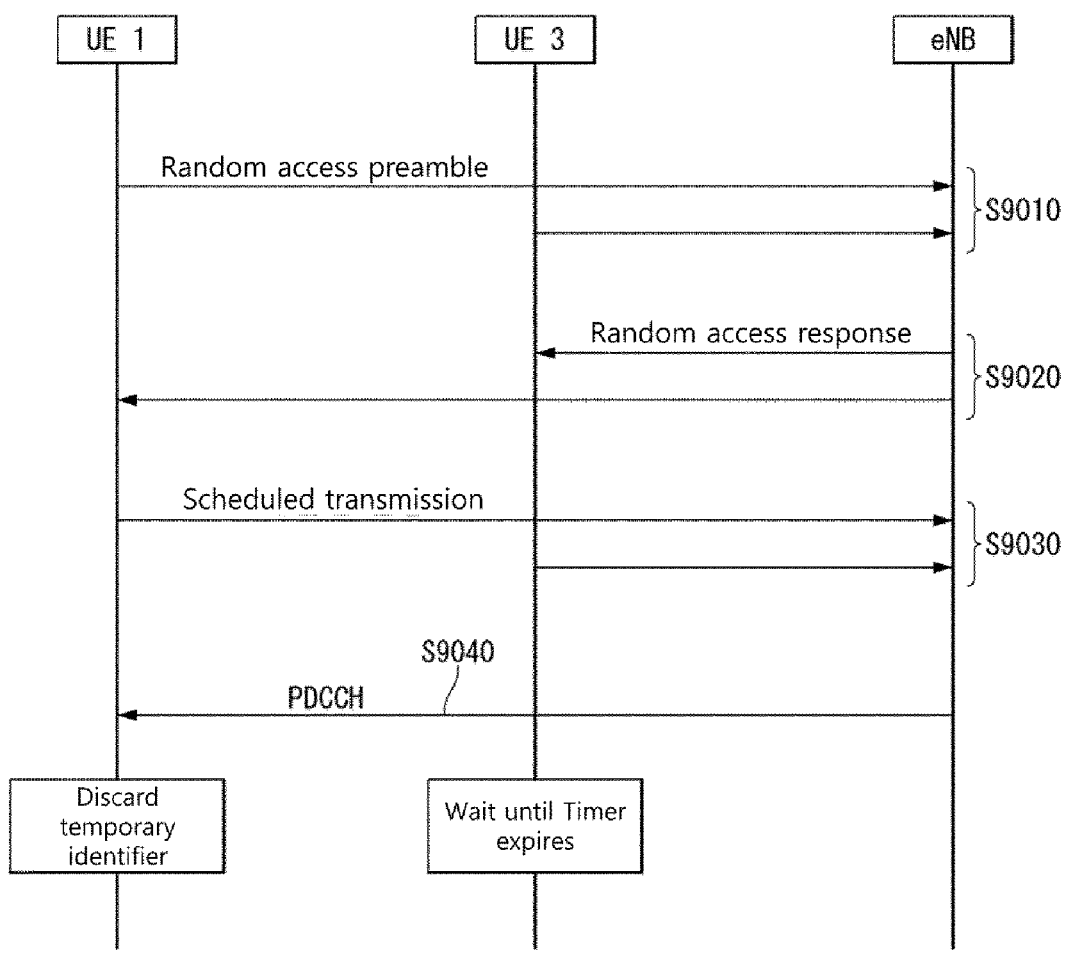
FIG. 9 is a diagram illustrating an example of a contention resolution method in a random access procedure of a plurality of UEs in the LTE system.

FIG. 9 is a diagram illustrating an example of a contention resolution method in a random access procedure of a plurality of UEs in the LTE system.

In FIG. 9, it is assumed that UE 1 is in RRC connected state and UE 3 is in RRC idle state. That is, in FIG. 9, UE 1 has a valid cell identifier, and UE 3 does not have a valid cell identifier.

The reason why a collision occurs in performing a random access is that the number of random access preambles is finite, basically.

That is, since an eNB is unable to provide UE-specific random access preambles to all UEs, UE 1 and UE 3 select and transmit one among common random access preambles arbitrarily (step, S9010).

Accordingly, a case is occurred that two or more UEs select and transmit an identical random access preamble through the same radio resource (PRACH resource), but the eNB determines it to be a single random access preamble transmitted by one UE.

Owing to this, the eNB transmits a random access response to the UEs and predicts that one UE receives the random access response (step, S9020).

However, since a collision may occur as described above, two or more UEs receive a single random access response, and accordingly, each UE performs an operation according to the reception of the random access response (step, S9030).

That is, a problem occurs that two or more UEs transmit different data to the same radio resource using a single UL Grant included in the random access response. Accordingly, all the data transmissions may be failed or the eNB may receive only the data of a specific UE depending on positions or transmission powers of UEs.

For latter case, since all of the two or more UEs assume that their own data transmissions are succeeded, the eNB needs to inform information for the failure to the UEs that fail in the contention. In other words, the operation of notifying information for failure or success in the contention is referred to the Contention Resolution.

The Contention Resolution includes two methods: One method is using a Contention Resolution timer (hereinafter, CR timer) and another method is transmitting an identifier of the UE that succeeds in the contention to UEs.

The former case is used for the case that a UE has a unique cell identifier (C-RNTI) already before the random access procedure. That is, the UE that has a cell identifier already transmits data including its own cell identifier to the eNB according to the random access response and operates the CR timer.

Then, before the CR timer expires, when UE 1 receives PDCCH information including its own cell identifier, UE 1 determines that UE 1 succeeds in the contention and complete the random access normally (step, S9040).

However, before the CR timer expires, in the case that the UE fails to receive a PDCCH including its own cell identifier, the UE determines that the UE fails in the contention and performs the random access procedure again or notifies the failure to a higher layer.

The latter case among the Contention Resolution method, that is, the method of transmitting an identifier of the UE that succeeds in the contention is used in the case that the UE does not have a unique cell identifier before the random access procedure. That is, UE 3 does not have its own cell identifier, according to the UL Grant information included in the random access response, UE 3 transmits data with a higher identifier (S-TMSI or Random ID) than the cell identifier being included, and UE 3 operates the CR timer.

Before the CR timer expires, in the case that data including its own higher identifier is transmitted to a DL-SCH, the UE determines that the random access procedure is succeeded.

However, in the case that UE 3 fails to receive data including its own higher identifier through the DL-SCH before the CR timer expires, UE 3 determines that the random access procedure is failed.

In the case of the method, there is a problem that the UE needs to wait until the timer expires to identify the fact of failure although the random access procedure is failed.

Accordingly, to solve the problem above, the present disclosure proposes a method for an eNB to transmit an indication message to a failed UE to inform the fact of failure, in the case that the random access procedure is failed.

Figure 10:
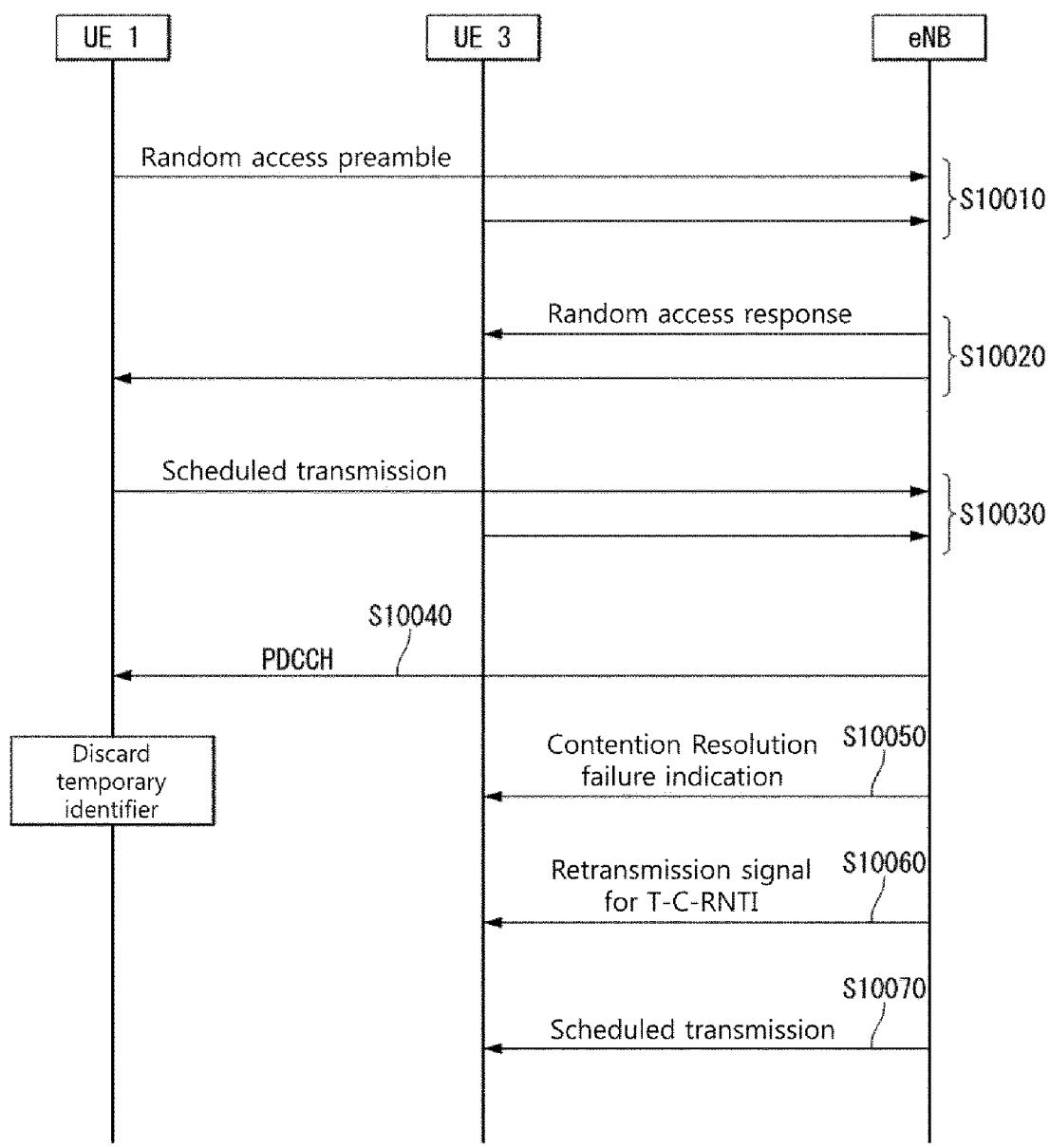
FIG. 10 is a diagram illustrating an example of a random access procedure of a plurality of UEs to which the present invention may be applied.

FIG. 10 is a diagram illustrating an example of a random access procedure of a plurality of UEs to which the present disclosure may be applied.

Referring to FIG. 10, in the case that a plurality of UEs transmits an identical random access preamble to an eNB, the eNB may transmit an indication message to the UE that fails in decoding.

Hereinafter, in the present disclosure, UE 3 may be in RRC connected state or RRC idle state.

First, the description of step S10010 and step S10020 is omitted since step S10010 and step S10020 are the same as step S9010 and S9020.

Accordingly, each UE performs an operation according to reception of the random access response. In other words, UE 1 transmits Msg 3 including C-RNTI MAC CE through the UL grant which is allocated through the random access response from the eNB (step, S10030).

Also, UE 3 transmits Msg 3 through the UL grant which is allocated through the random access response from the eNB.

At this time, UE 3 that is allocated with a temporary identifier which is the same as that of UE 1 transmits Msg 3 including C-RNTI MAC CE different from that of UE 1, and in the case that UE 3 is in RRC idle state, UE 3 transmits Msg 3 including CCCG SDU to the eNB.

Afterward, in the case that the eNB succeeds in decoding of Msg 3 transmitted by UE 1, the eNB transmits a PDCCH identified by C-RNTI to UE 1 (step, S10040), and UE 1 discards the allocated temporary identifier.

The eNB transmits a PDCCH to UE 1, and simultaneously, transmits an indication message indicating that the Contention Resolution is failed to the UEs allocated with a temporary identifier which is identical to UE 1 (step, S10050).

The indication message indicating that the Contention Resolution is failed may be identified by a temporary identifier and transmitted through a MAC sub-header.

At this time, a new LCID may be allocated for the indication message indicating that the Contention Resolution is failed.

The UE that is allocated with a temporary identifier identical to that of UE 1, after transmitting Msg 3, is started to monitor a PDCCH transmitted from the eNB with the allocated temporary identifier without regard to whether Msg 3 includes CCCH SDU or C-RNTI MAC CE.

When UE 3 receives the indication message which is identified by the temporary identifier in step S10050, UE 3 performs different operations depending on whether Msg 3 includes CCCH SDU or C-RNTI MAC CE.

In the case that UE 3 transmits Msg 3 including CCCH SDU, when UE 3 receives the indication message indicating that the Contention Resolution is failed, UE 3 recognizes that the Contention Resolution is failed even before the timer expires and performs the random access procedure again.

Particularly, UE 3 that has a valid temporary identifier does not start the random access procedure again with the same RA-RNTI but performs an operation according to reception of the random access response through the valid temporary identifier which is already allocated (step, S10070).

In other words, since the temporary identifier allocated by the eNB is still valid RNTI, even in the case that the random access procedure is failed, Msg 3 may be transmitted again through the valid temporary identifier.

At this time, Msg 3 may include CCCH SDU.

In this case, the eNB may transmit a retransmission signal indicating to perform the random access procedure again to UE 3 through T-C-RNTI (step, S10060).

In the case that UE 3 transmits Msg 3 with C-RNTI MAC CE being included to the eNB, when UE 3 receives a PDCCH which is not identified by C-RNTI of Msg 3 transmitted by UE 3 itself, UE 3 recognizes that the Contention Resolution is failed even before the timer does not expire.

Later, UE 3 performs the random access procedure again.

Particularly, UE 3 that has a valid temporary identifier does not start the random access procedure again with the same RA-RNTI but performs an operation according to reception of the random access response through the valid temporary identifier which is already allocated (step, S10070).

In other words, since the temporary identifier allocated by the eNB is still valid RNTI, even in the case that the random access procedure is failed, Msg 3 may be transmitted again through the valid temporary identifier.

At this time, Msg 3 may include C-RNTI MAC CE.

In this case, the eNB may transmit a retransmission signal indicating to perform the random access procedure again to UE 3 through T-C-RNTI (step, S10060).

As another embodiment of the present disclosure, in the case that UE 1 is in RRC connected state, and UE 3 is in RRC idle state in FIG. 10, the eNB may succeed in decoding of Msg 3 including CCCH SDU.

In this case, the eNB transmits a PDCCH identified by the temporary identifier, and UE 1 and UE 3 start to monitor the PDCCH transmitted from the eNB without regard to whether Msg 3 includes CCCH SDU or C-RNTI MAC CE.

In the case that UE 1 receives the PDCCH identified by the temporary identifier, since Msg 3 is transmitted with C-RNTI MAC CE, even in the case that the timer does not expire, UE 1 recognizes that Contention Resolution is failed and performs the random access procedure again.

At this time, UE 1 does not start the random access procedure from the first stage as described above but performs from Msg 3 transmission again.

Since UE 3 transmits Msg 3 with CCCH SDU to the eNB, when CR Identity of a PDCCH is identical to that of transmitted from Msg 3 by UE 3 itself, UE 3 recognizes that Contention Resolution is succeeded, and otherwise, UE 3 recognizes that Contention Resolution is failed.

In this case, UE 3 performs the random access procedure again.

At this time, UE 3 does not start the random access procedure from the first stage as described above but performs from Msg 3 transmission again.

Using such a method, when a UE accesses to an eNB through a random access procedure to transmit uplink data, even in the case that the random access procedure is failed, the UE does not perform the random access procedure from the first stage but transmits Msg 3 again through a valid identifier.

Accordingly, delay owing to the random access procedure of the UE may be reduced.

Figure 11:
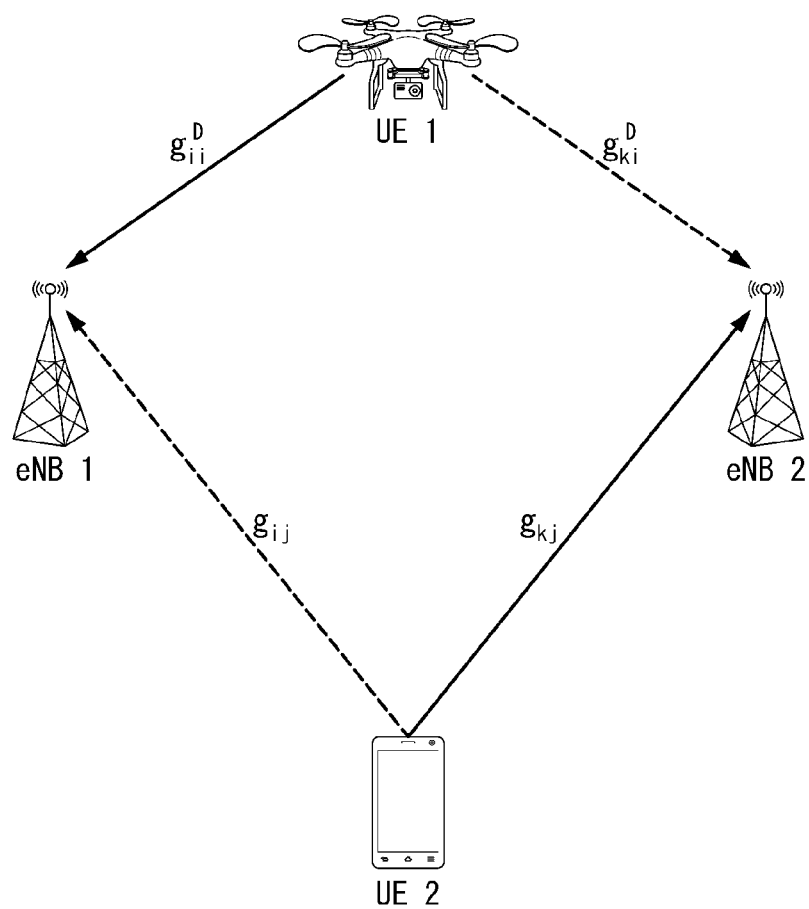
FIG. 11 is a diagram illustrating an example of interference exerted to an adjacent UE by a UE in high altitude.

FIG. 11 is a diagram illustrating an example of interference exerted to an adjacent UE by a UE in high altitude.

Referring to FIG. 11, since signal strength of a UE in high altitude is strong, there is significant influence exerted on an adjacent UE or an eNB.

Particularly, UEs flying in the air (e.g., drones, etc.) may have different propagation property than the existing UEs moving through the ground.

In the case that the UEs flying in the air fly in a lower altitude than an antenna height of the eNB, the UEs may have the same propagation property as the general UEs in the ground. However, in the case that the UEs flying in the air fly in a higher altitude than an antenna height of the eNB, the uplink signal from the UEs flying in the air may be observed well in a plurality of cells by line-of-sight propagation condition.

However, the uplink signal from the UEs flying in the air increases interference in an adjacent cell, and the increased interference may badly influence on communications of the UEs in the ground.

Accordingly, it is required for a network to restrict communications of the UEs flying in the air such that throughput performance of the UE in the ground owing to the UEs flying in the air.

For example, since an influence of the UEs flying in the air exerted on an adjacent cell becomes significant, to lower signal strength of the flying UE according to an altitude, a transmission power of uplink signal of the UE may be restricted.

The power control is one of efficient methods that cope with interference from neighboring cell users.

To reduce interference exerted on an adjacent cell from the UE flying in the air, depending on an interference situation from a serving eNB, the UE flying in the air may decrease a transmission power of uplink signal of the UE or set to 0 temporarily.

Feedback in the closed loop power control in the connected mode may be used for adjusting a transmission power level.

The eNB receives uplink signal from the UE, and the eNB estimates an optimal transmission power level that the UE is going to use based on other parameters such as SINR and BER as well as the power level of the received uplink signal, to improve communication link performance.

The estimated power level is transferred to the UE from the eNB through a control channel, and the UE adjusts the transmission power according to the feedback provided by the eNB.

Referring to FIG. 11, the solid line denotes communication between each UE and the eNB, and the dotted line denotes interference exerted on an adjacent cell by the UE.

In FIG. 11, $g_{11}^D$ means a link gain from UE 1 to eNB 1, and $g_{kj}^D$ is a link gain from UE 2 to eNB 2.

$g_{ki}^D$ represents a link gain from UE 1 to eNB 2 which is a neighboring eNB, which represents interference from UE 1 to eNB 2.

$g_{11}^D$ represents a link gain from UE 2 to eNB 1 which is a neighboring eNB, which represents interference from UE 2 to eNB 1.

At this time, uplink SINR of UE 1 and UE 2 may be defined as Equation 9 below.

$$\text{Uplink SINR of } \gamma_i^D = \frac{g_{ii}^D p_i}{g_{ii} p_j + N} \quad UE\ 1 \qquad \text{[Equation 9]}$$

$$\text{Uplink SINR of } \gamma_j = \frac{g_{kj} p_j}{g_{ki}^D p_i + N} \quad UE\ 2$$

$p_i$ in Equation 9 above means a transmission power of UE 1, and N means a noise.

In uplink situation, since it is probable that UE 1 has lower line of sight (LOS) channel gain than UE 2, UE 1 may cause more interference than UE 2.

Accordingly, in Equation 9, $g_{ii}^D p_i$ and $g_{ki}^D p_i$ may have higher values than the channel gain of UE 2.

In the case that reception power or transmission power is restricted to reduce influence of interference exerted on an adjacent cell by UE 1, SINR of UE 2 may be not degraded by uplink signal of UE 1.

Accordingly, in the case that eNB 1 recognizes that UE 1 exerts significant influence on the adjacent cell, the eNB reduces or removes the power of UE 1 temporarily, SINR of the UE 2 may be increased and SINR of UE 1 may be guaranteed.

Assuming that a Drone UE exerts significant interference on an LTE UE, the eNB may reduce or remove the power of the Drone UE temporarily, SINR of the LTE UE may be increased and SINR of the Drone UE may be guaranteed.

Figure 12:
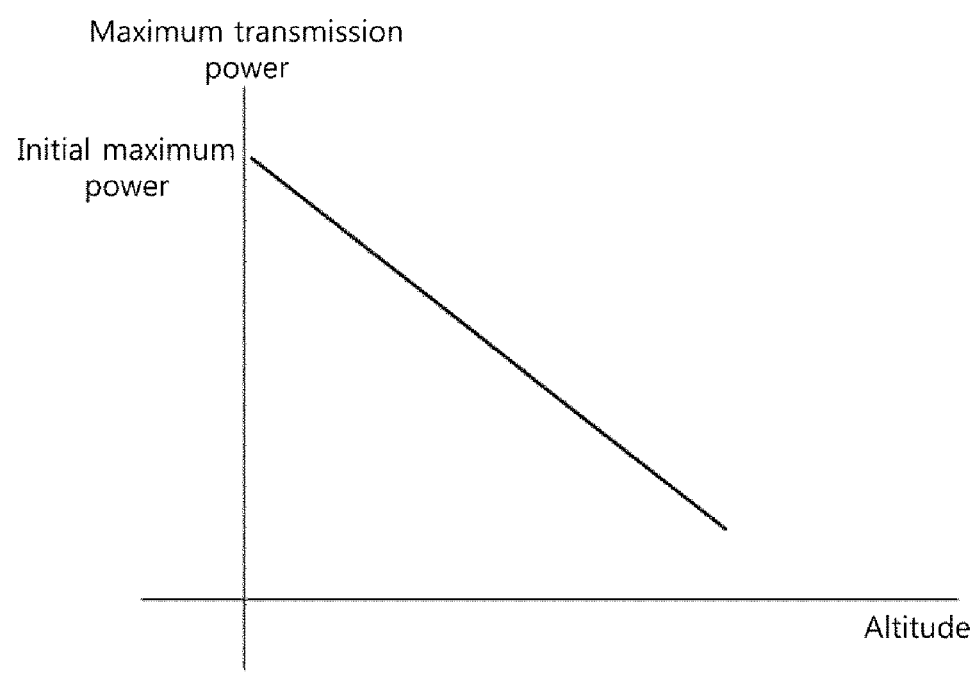
FIG. 12 is a diagram illustrating an example of a method for transmission power of a UE depending on an altitude.

FIG. 12 is a diagram illustrating an example of a method for transmission power of a UE depending on an altitude.

Referring to FIG. 12, the transmission power of a UE is decreased with higher altitude, interference exerted on an adjacent cell by the UE flying in the air may be reduced.

Particularly, as an altitude of UE 1 flying in the air becomes higher, the probability of being Line of Sight is increased for the uplink signal transmitted from UE 1 to eNB 1, interference for an adjacent cell increases.

Accordingly, by reducing maximum transmission power of UE 1 regularly with higher altitude of UE 1, interference exerted on an adjacent cell by UE 1 decreases.

In other words, the transmission power of UE 1 may be linearly decreased depending on an altitude according to a specific Equation as shown in the graph of FIG. 12.

For example, the transmission power of UE 1 may be reduced depending on an altitude as represented in Equation 10 or Equation 11 below.

$$\text{Maximum power=initial maximum power}-a\ (\text{altitude})^{\wedge}b\ (a: \text{inclination}, b=0, 1, 2, 3, 4) \qquad \text{[Equation 10]}$$

$$\text{Maximum power} = \qquad \text{[Equation 11]}$$
$$\begin{cases} \text{Initial power } (dBm) \text{ altitude of } UE\ < \\ \qquad \text{specific altitude} \\ \text{Initial power } (dBm) - \\ k\log 10(\text{altitude}) \text{ altitude of } UE\ \geq\ \text{specific altitude} \end{cases}$$

In Equation 10, the inclination may be changed depending on a (first parameter) value, and a and b may be configured to UE 1 by the eNB.

The restriction in transmission power according to Equation 11 may be used for restricting the transmission power of UE 1 in the case that Line of Sight occurs in a specific altitude or higher.

In Equations 10 and 11, a, b, k, B, initial maximum power, specific altitude, and the like, which are parameters to restrict the transmission power of UE 1 may be preconfigured and known to UE 1 and UE 2 in advance.

Alternatively, the eNB may transmit a, b, k, B, initial maximum power and specific altitude to the UE through control information.

For example, it may be configured by the eNB to the UE through RRC signaling or higher layer signaling or broadcasted with by Common Control Signaling the eNB to the UE through DCI or SIB.

At this time, the eNB may inform the Equation for controlling the transmission power of UE 1 depending on an altitude to the UE.

As another embodiment of the present disclosure, the transmission power of UE may be controlled by a table value which is configured between the UE and the eNB.

Particularly, the transmission power value of UE 1 depending on an altitude may be determined according to a predetermined table, and the transmission power table representing a transmission power depending on an altitude may be preconfigured between UE 1 and eNB 1.

For example, the transmission power of UE 1 depending on an altitude may be determined by Table 7 below.

TABLE 7

| Maximum transmission power | Altitude for UE type A (m) | Altitude for UE type B (m) |
|---|---|---|
| 23 dBm | 100 | 100 |
| 20 dBm | 150 | 200 |
| 18 dBm | 200 | 300 |
| 16 dBm | 250 | 400 |
| 14 dBm | 300 | 500 |

According to Table 7 above, the maximum transmission power of UE 1 for an altitude may be determined according to a type.

At this time, the transmission power table may be preconfigured and promised between UE 1 and eNB 1, or the eNB may configure it to the UE through RRC signaling or higher layer signaling.

Alternatively, the eNB may broadcast the transmission power table with common control signaling through DCI or SIB, or the like.

In this embodiment, Table 7 is just an example of transmission power table. A plurality of transmission power tables may be existed, and different transmission power tables may be applied depending on the environment of system (e.g., traffic change, change of total interference).

At this time, the eNB may transmit a configure signal that indicates a change of the transmission power table flexibly and change the transmission power table.

As another embodiment of the present disclosure, eNB 1 may directly signal the maximum transmission power of UE 1 depending on an altitude through RRC signaling, higher layer signaling or common control signaling.

In this case, UE 1 transmits uplink signal using the maximum transmission power which is signaled from eNB 1.

Using such a method, a transmission power of UE that causes interference on an adjacent cell depending on an altitude, and accordingly, occurrence of interference may be decreased.

Figure 13:
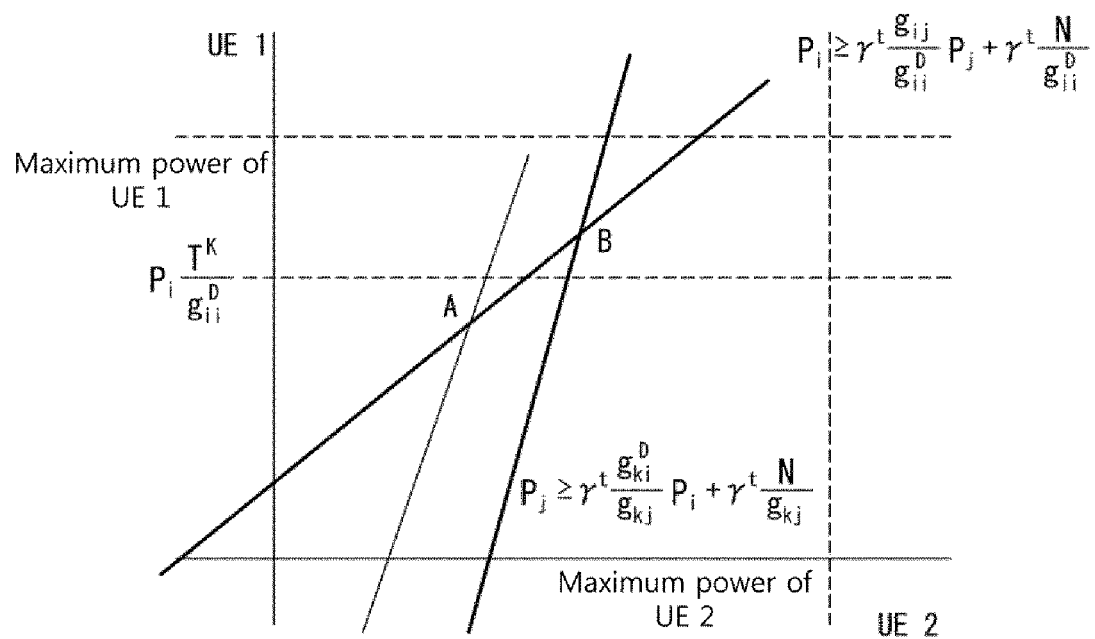
FIG. 13 is a diagram illustrating another example of a method for controlling a transmission power of a UE depending on an altitude.

FIG. 13 is a diagram illustrating another example of a method for controlling a transmission power of a UE depending on an altitude.

Referring to FIG. 13, in the case that a signal strength of UE increases depending on an altitude and causes interference on an adjacent cell, an eNB may control a transmission power of UE and reduce occurrence of interference.

Particularly, to reduce interference on an adjacent cell depending on an altitude, the power minimization problem may be considered as represented in Equation 12 below.

$$\text{Minimize } p_i^D + p_j \quad \text{[Equation 12]}$$

$$\text{subject to } p_i \geq \gamma^t \frac{g_{ij}}{g_{ii}^D} p_j + \gamma^t \frac{N}{g_{ii}^D}$$

$$\gamma_i = \frac{g_{ii}^D p_i}{g_{ij} p_j + N} \geq \gamma^t$$

$$g_{ii}^D p_j \leq T^K$$

-continued $$\gamma_j = \frac{g_{kj} p_j}{g_{ki}^D p_i + N} \geq \gamma^t$$

$$p_j \geq \gamma^t \frac{g_{ki}^D}{g_{kj}} p_i + \gamma^t \frac{N}{g_{kj}}$$

$$P_i \leq P^{MAX}$$

$$p_j \leq P^{MAX}$$

An optimal solution for power minimization of Equation 12 may be shown in the graph of FIG. 13.

Particularly, in the case that power $g_{ii}^D p_i$ of reception signal of UE 1 is greater than specific threshold value T, a transmission power of UE 1 may be restricted.

At this time, specific threshold value T may be determined by at least one factors that cause interference such as a size of received power, LoS probability or altitude of UE 1.

In the graph of FIG. 13, UE 1 may transmit uplink signal in both of area A and area B. However, in the case that $g_{ii}^D p_i$ of UE 1 is greater than T in area B, a transmission power of UE 1 may be restricted or configured to '0' (or OFF).

For example, in FIG. 13, A and B in the graph satisfy the maximum power condition of UE 1 and UE 2, UE 1 and UE 2 may transmit uplink signal.

However, in the case that a transmission power is restricted depending on an altitude, since the transmission power condition depending on an altitude is satisfied in A, both of UE 1 and UE 2 may transmit uplink signal. However, since the transmission power condition depending on an altitude is satisfied in B for UE 1, the transmission power is restricted, and UE 1 may not transmit uplink signal.

At this time, in the scheme of restricting the transmission power of UE 1, in the case that $g_{ii}^D p_1$ of UE 1 is greater than T, transmission power $P_i(n+1)$ in the next n+1 after time n may be determined by Equation 13 below.

$$P_i(n+1) = \min\left\{\frac{\gamma^{UL-Target}}{\gamma_i^{UL}(n)} P_i(n), \frac{T^K}{g_{ik}}\right\} \quad \text{[Equation 13]}$$

Alternatively, in the scheme of configuring the transmission power of UE 1 to '0' (or OFF), in the case that an iteration power after eNB 1 measures a reception signal of UE 1 is greater than T, the transmission power may be configured to '0' (or OFF) by Equation 14 below.

$$P_i(n+1) = \begin{cases} \frac{\gamma^{UL-Target}}{\gamma_i^{UL}(n)} P_i(n), & \frac{\gamma^{UL-Target}}{\gamma_i^{UL}(n)} P_i(n) \leq \frac{T^K}{g_{ik}} \\ 0, & \frac{\gamma^{UL-Target}}{\gamma_i^{UL}(n)} P_i(n) > \frac{T^K}{g_{ik}} \end{cases} \quad \text{[Equation 14]}$$

In the case of controlling the transmission power depending on an altitude of UE using such a method, there is an effect that interference occurred on an adjacent cell when the UE transmits uplink signal may be alleviated.

Figure 14:
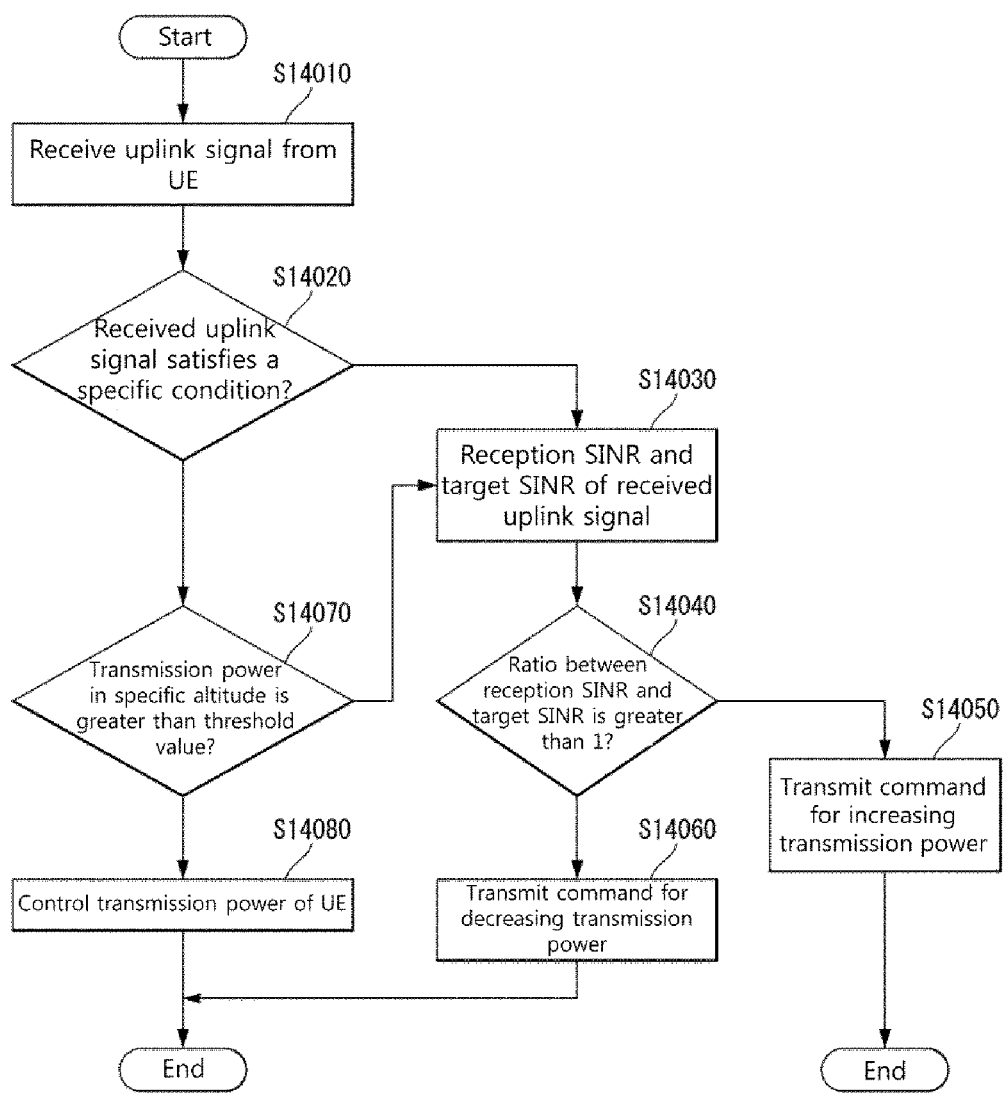
FIG. 14 is a flowchart illustrating an example of a method for controlling a transmission power of a UE depending on an altitude.

FIG. 14 is a flowchart illustrating an example of a method for controlling a transmission power of a UE depending on an altitude.

Referring to FIG. 14, a UE causes interference on an adjacent cell depending on an altitude, an eNB may control the transmission power of the UE using the method described in FIG. 12 or FIG. 13.

Particularly, after eNB 1 receives uplink signal from UE 1 (step, S14010), eNB 1 determines whether the received uplink signal satisfies a specific condition (step, S14020).

For example, in the case that the transmission power of UE 1 does not satisfy Equation 15 below in p(n+1), eNB 1 calculates $\gamma_i^{UL}(n)$, which is SINR of the received uplink signal and calculates a ratio value with the target SINR value, $\gamma^{UL}$-Target (step, S14030).

$$\frac{\gamma^{UL-Target}}{\gamma_i^{UL}(n)} P_i(n) \geq \frac{T^K}{g_{ik}} \quad \text{[Equation 15]}$$

eNB 1 determines whether the ratio value is greater than 1 (step, S14040), and in the case that the ratio value is greater than 1, eNB 1 transmits a command for increasing the transmission power of UE 1 as much as Equation 16 below to UE 1 (step, S14050).

$$\frac{\gamma^{UL-Target}}{\gamma_i^{UL}(n)} P_i(n) \quad \text{[Equation 16]}$$

However, in the case that the ratio value is greater than 1, eNB 1 transmits a command for decreasing the transmission power of UE 1 as much as Equation 14 to UE 1 (step, S14060).

In the case that the transmission power of UE 1 satisfies Equation 13, eNB 1 determines whether a transmission power of UE 1 or a transmission power in a specific altitude is greater than a threshold value (step, S14070).

In the case that the transmission power is smaller than the threshold value, the eNB performs the procedure after step S14030.

However, in the case that the transmission power is greater than the threshold value, the eNB controls the transmission power of UE 1 using the method described in FIG. 12 and FIG. 13 (step, S14080).

At this time, in the case that the transmission power is controlled using the method of restricting the transmission power of UE 1 described in FIG. 13, eNB 1 may transmit an indicator or a command indicating to transmit a specific transmission power value that satisfies a threshold value in n+1 to UE 1.

Equation 17 below represents an example of the specific transmission power value.

$$p(n+1) = \frac{T^K}{g_{ik}} \quad \text{[Equation 17]}$$

In this case, UE 1 transmits a specific transmission power value $$\frac{\gamma^{UL-Target}}{\gamma_i^{UL}(n)} P_i(n) \text{ or } \frac{T^K}{g_{ik}}$$

to eNB 1.

Alternatively, in the case that a transmission power is controlled by using the method of configuring the transmission power of UE 1 to '0' (or OFF) described in FIG. 13, instead of instructing UE 1 to transmit a specific transmission power value, eNB 1 configures the transmission power of UE 1 to '0' (or OFF) or transmits an indicator or command indicating to stop transmission of uplink signal.

In this case, UE 1 may configure the transmission power to '0' until the next iteration (n+2) or stop uplink transmission.

Figure 15:
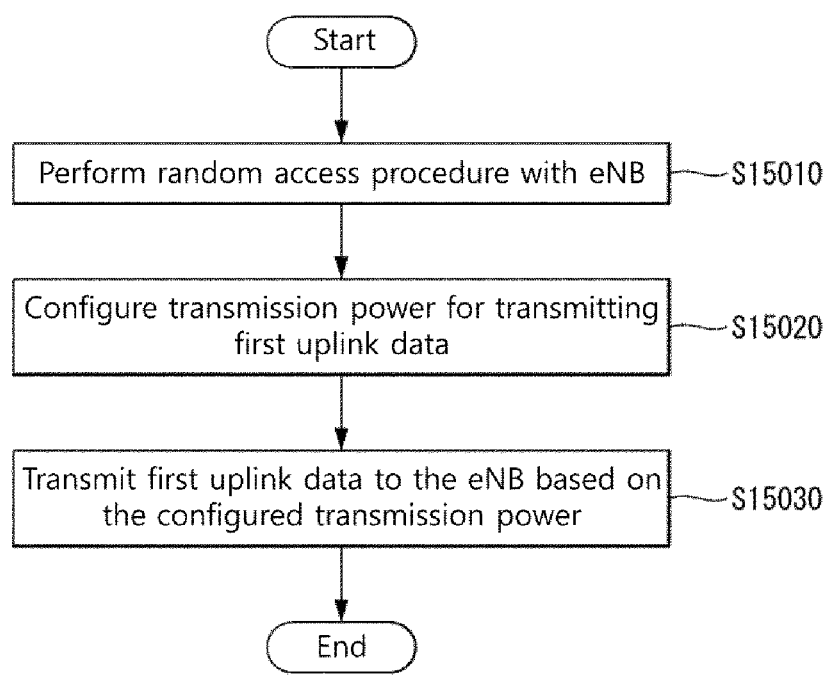
FIG. 15 is a flowchart illustrating an example of UE operation for transmitting uplink data by controlling a transmission power depending on an altitude.

FIG. 15 is a flowchart illustrating an example of UE operation for transmitting uplink data by controlling a transmission power depending on an altitude.

Particularly, to transmit uplink data by controlling a transmission power depending on an altitude, a UE performs a random access procedure with an eNB (step, S15010). At this time, the random access procedure may be a contention-based random access procedure described in FIG. 8(a) or a non-contention-based random access procedure described in FIG. 8(b).

At this time, in the case that the UE accesses to the eNB by performing the contention-based random access procedure described in FIG. 8(a), the UE fails in the Contention Resolution and performs the random access procedure again.

In this case, the UE may perform the random access procedure again using the method described in FIG. 8(a) or performs the random access procedure again using the method described in FIG. 10.

Later, the UE's transmission power from the eNB may be controlled using the method described in FIG. 12 to FIG. 14, and the UE may configure the transmission power of uplink data based on a control from the eNB (step, S15020).

At this time, the transmission power of uplink data may be configured depending on an altitude of the UE as described in FIG. 12 to FIG. 14.

The UE may transmit first uplink data to the eNB based on the configured transmission power (step, S15030).

Figure 16:
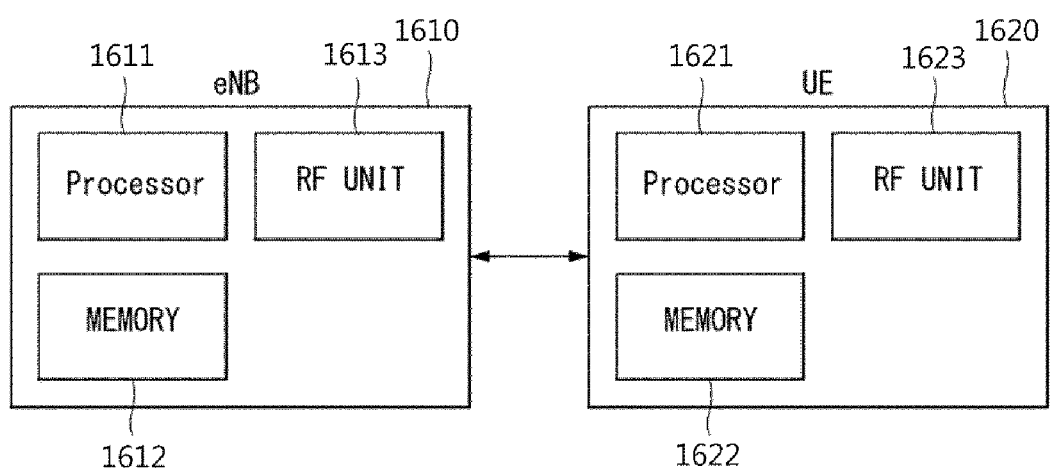
FIG. 16 is a diagram illustrating an example of the internal block diagram of a wireless device to which the present invention may be applied.

FIG. 16 is a diagram illustrating an example of the internal block diagram of a wireless device to which the present disclosure may be applied.

In this case, the wireless device may be an eNB and a UE, and the eNB includes both a macro eNB and a small eNB.

As shown in FIG. 16, the eNB 1610 and the UE 1620 include communication units (or transmission/reception units or RF units) 1613 and 1623, processors 1611 and 1621, and memories 1612 and 1622, respectively.

In addition, each of the eNB and the UE may further include an input unit and an output unit.

The communication unit 1613 or 1623, the processor 1611 or 1621, the input unit, the output unit, and the memory 1612 or 1622 are functionally coupled in order to perform the methods proposed in this specification.

When receiving information produced by a physical layer (PHY) protocol, the communication unit (or the transmission/reception unit or the RF unit) 1613 or 1623 moves the received information to a Radio-Frequency (RF) spectrum, performs filtering and amplification on the information, and sends the signal to an antenna. Furthermore, the communication unit moves the RF signal, received from the antenna, to a band that may be processed in the PHY protocol and performs filtering on the RF signal.

Furthermore, the communication unit may have a switch function for changing such transmission and reception functions.

The processor 1611 or 1621 implements the functions, processes and/or methods proposed in this specification. The layers of a radio interface protocol may be implemented by the processor.

The processor may be represented as a control unit, a controller, a control unit, or a computer.

The memory 1612 or 1622 is connected to the processor and stores protocols or parameters for performing an uplink resource allocation method.

The processor 1611 or 1621 may include application-specific integrated circuits (ASICs), other chipsets, logic circuits and/or data processing devices. The memory may include read-only memory (ROM), random access memory (RAM), flash memory, a memory card, a storage medium and/or other storage devices. The communication unit may include baseband circuits for processing radio signals. When an embodiment is implemented in software, the method may be implemented as a module (process or function, etc.) for performing the functions.

The module may be stored in the memory and may be executed by the processor. The memory may be positioned inside or outside the processor and may be connected to the processor by well-known means.

The output unit (or display unit or indication unit) is controlled by the processor and outputs information output by the processor along with a key entry signal generated from a key input unit and various information signals from the processor.

Furthermore, the drawings have been divided and described for convenience of description, but the embodiments described with reference to the drawings may be merged to implement a new embodiment. Furthermore, the scope of the present disclosure also includes designing a computer-readable recording medium in which a program for executing the above-described embodiments has been written according to the needs of those skilled in the art.

The method for transmitting and receiving reference signals according to this specification is not limitedly applied to the configurations and methods of the aforementioned embodiments, but some or all of the embodiments may be selectively combined and configured so that the embodiments are modified in various ways.

Meanwhile, the method and apparatus for transmitting and receiving data by controlling a transmission power of a UE according to this specification may be implemented in a recording medium, readable by a processor included in a network device, in the form of code readable by the processor. The processor-readable recording medium includes all types of recording devices in which data readable by a processor is stored. The processor-readable recording medium may include ROM, RAM, CD-ROM, magnetic tapes, floppy disks, and optical data storages, for example. Furthermore, the processor-readable recording medium may be implemented in the form of carrier waves, such as transmission over the Internet. Furthermore, the processor-readable recording medium may be distributed to computer systems connected over a network, and code readable by a processor may be stored in the processor-readable recording medium and executed in a distributed manner.

In addition, although the preferred embodiments of this specification have been illustrated and described above, this specification is not limited to the above-described specific embodiments, and a person having ordinary skill in the art to which the present disclosure pertains may modify the present disclosure in various ways without departing from the gist of the present disclosure in the claims. Such modified embodiments should not be individually understood from the technical spirit or prospect of the present disclosure.

Furthermore, in this specification, both the apparatus invention and the method invention have been described, but the descriptions of both the inventions may be complementally applied, if necessary.

INDUSTRIAL APPLICABILITY

The RRC connection method in a wireless communication system of the present disclosure has been illustrated as being applied to the 3GPP LTE/LTE-A system but may also be applied to various wireless communication systems in addition to the 3GPP LTE/LTE-A system.

What is claimed is:

1. A method for transmitting uplink data to a base station in a wireless communication system, the method performed by a User Equipment comprising:
    performing a random access procedure with the base station;
    configuring a transmission power for transmitting first uplink data; and
    transmitting the first uplink data to the base station according to the configured transmission power,
    wherein the transmission power is configured depending on an altitude of the User Equipment, and
    wherein a maximum value for the transmission power is configured to decrease as the altitude of the User Equipment increases.

2. The method of claim 1, further comprising receiving control information including a first parameter and a second parameter for configuring the transmission power depending on the altitude from the base station,
    wherein the transmission power is configured according to the first parameter and the second parameter,
    wherein the first parameter indicates the altitude, and
    wherein the second parameter is an arbitrary integer value for reducing the transmission power depending on the altitude.

3. The method of claim 2, wherein the transmission power is reduced according to the following mathematical expression depending on the altitude, and wherein 'a' is the first parameter and 'b' is the second parameter in the following mathematical expression, $$\text{transmission power} = \text{initial transmission power} - a \cdot b.$$

4. The method of claim 1, wherein the transmission power is configured based on a preconfigured value to the User Equipment and the base station depending on the altitude.

5. The method of claim 1, further comprising receiving transmission power information indicating the transmission power from the base station.

6. The method of claim 1, wherein the step of configuring the transmission power further includes:
    when a reception signal power of a signal from the User Equipment is greater than a threshold value, receiving from the base station a command indicating a transmission of a transmission power value smaller than the threshold value from the base station.

7. The method of claim 1, wherein the step of configuring the transmission power includes:
    when a reception signal power of a signal from the User Equipment is greater than a threshold value,
    receiving, from the base station, an indication message for configuring the transmission power of the User Equipment to '0' in a specific duration or for indicating a transmission stop of the uplink data.

8. The method of claim 1, wherein the step of performing the random access procedure includes:
    transmitting a random access preamble for an access to the base station;
    receiving a random access response message from the base station, wherein the random access response message includes at least one of a Timing Alignment (TA)

indicating timing offset information for synchronization, radio resource allocation information used in the uplink or a temporary identifier for UE identification;

transmitting second uplink data according to the radio resource allocation information;

receiving an indication message indicating decoding failure of the second uplink data from the base station; and retransmitting the second uplink data to the base station.

9. The method of claim 8, wherein the indication message is identified by the temporary identifier and transmitted by a MAC sub-header.

10. The method of claim 1, wherein, based on the altitude of the User Equipment being greater than a specific value, the maximum value for the transmission power is configured to decrease as the altitude of the User Equipment increases.

11. A User Equipment for transmitting uplink data to a base station in a wireless communication system, comprising:

a Radio Frequency Unit including a transceiver for transmission and receiving a radio signal with exterior; and a processor functionally connected to the communication unit, wherein the processor is configured to:

perform a random access procedure with the base station;

configure a transmission power for transmitting first uplink data; and transmit the first uplink data to the base station according to the configured transmission power, wherein the transmission power is configured depending on an altitude of the User Equipment, and wherein a maximum value for the transmission power is configured to decrease as the altitude of the User Equipment increases.

12. The User Equipment of claim 11, wherein the processor receives control information including a first parameter and a second parameter for configuring the transmission power depending on the altitude from the base station, wherein the transmission power is configured according to the first parameter and the second parameter, wherein the first parameter indicates the altitude, and wherein the second parameter is an arbitrary integer value for reducing the transmission power depending on the altitude.

13. The User Equipment of claim 12, wherein the transmission power is reduced according to the following mathematical expression depending on the altitude, and wherein 'a' is the first parameter and 'b' is the second parameter in the following mathematical expression, transmission power=initial transmission power$-a^{\wedge}b$.

14. The User Equipment of claim 11, wherein the transmission power is configured based on a preconfigured value to the User Equipment and the base station depending on the altitude.

15. The User Equipment of claim 11, wherein the processor receives transmission power information indicating the transmission power from the base station.

16. The User Equipment of claim 11, wherein the processor:

when a reception signal power of a signal from the User Equipment is greater than a threshold value, receives from the base station a command indicating a transmission of a transmission power value smaller than the threshold value from the base station.

17. The User Equipment of claim 11, wherein the processor:

when a reception signal power of a signal from the User Equipment is greater than a threshold value, receives, from the base station, an indication message for configuring the transmission power of the User Equipment to '0' in a specific duration or for indicating a transmission stop of the uplink data.

18. The User Equipment of claim 11, wherein the processor:

transmits a random access preamble for an access to the base station;

receives a random access response message from the base station, wherein the random access response message includes at least one of a Timing Alignment (TA) indicating timing offset information for synchronization, radio resource allocation information used in the uplink or a temporary identifier for UE identification;

transmits second uplink data according to the radio resource allocation information;

receives an indication message indicating decoding failure of the second uplink data from the base station; and retransmits the second uplink data to the base station.

19. The User Equipment of claim 18, wherein the indication message is identified by the temporary identifier and transmitted by a MAC sub-header.

20. The User Equipment of claim 11, wherein, based on the altitude of the User Equipment being greater than a specific value, the maximum value for the transmission power is configured to decrease as the altitude of the User Equipment increases.

* * * * *